United States Patent
Park et al.

(10) Patent No.: US 11,134,372 B2
(45) Date of Patent: Sep. 28, 2021

(54) DOWNLOADING PROFILES CORRESPONDING TO SUBSCRIBER IDENTIFICATION MODULES IN ELECTRONIC DEVICE

(71) Applicant: Samsung Electronics Co., Ltd., Gyeonggi-do (KR)

(72) Inventors: Jung-Sik Park, Gyeonggi-do (KR); Woo-Sup Lee, Gyeonggi-do (KR); Sun-Min Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 16/086,357

(22) PCT Filed: Jan. 13, 2017

(86) PCT No.: PCT/KR2017/000459
§ 371 (c)(1),
(2) Date: Sep. 19, 2018

(87) PCT Pub. No.: WO2017/164500
PCT Pub. Date: Sep. 28, 2017

(65) Prior Publication Data
US 2019/0104401 A1    Apr. 4, 2019

(30) Foreign Application Priority Data
Mar. 21, 2016  (KR) .......................... 10-2016-0033670

(51) Int. Cl.
*H04W 8/18*    (2009.01)
*H04W 8/20*    (2009.01)
(Continued)

(52) U.S. Cl.
CPC ............... *H04W 8/183* (2013.01); *H04L 9/30* (2013.01); *H04L 29/08* (2013.01); *H04L 67/306* (2013.01);
(Continued)

(58) Field of Classification Search
CPC ......... H04W 8/183; H04W 8/20; H04W 8/18; H04W 8/205; H04W 12/06; H04W 88/02;
(Continued)

(56) References Cited

U.S. PATENT DOCUMENTS 9,451,098 B2 *   9/2016   Zhu ........................ H04W 12/04
9,635,487 B2 *   4/2017   Rodgers ................... H04L 67/16
(Continued)

FOREIGN PATENT DOCUMENTS

CN    101341490 A    1/2009
CN    102870443 A    1/2013
(Continued)

OTHER PUBLICATIONS

European Search Report dated Nov. 14, 2018.
Chinese Search Report dated Nov. 30, 2020.

*Primary Examiner* — Quazi Farooqui
(74) *Attorney, Agent, or Firm* — Cha & Reiter, LLC.

(57) ABSTRACT

An electronic device is disclosed. An electronic device according to one embodiment comprises: a communication module; a memory including a security area for storing one or more profiles which correspond to at least one subscriber identity module (SIM); and a processor, wherein the processor is configured to: obtain a request for storing another profile in the memory, and, in response to the request, delete, from the memory, at least one profile of the profiles, or move the at least one profile to another memory which is operationally connected to the electronic device and includes another security area.

5 Claims, 24 Drawing Sheets

(51) Int. Cl.
*H04W 88/02* (2009.01)
*H04W 12/06* (2021.01)
*H04L 29/08* (2006.01)
*H04L 9/30* (2006.01)

(52) U.S. Cl.
CPC ............... *H04L 67/34* (2013.01); *H04W 8/18* (2013.01); *H04W 8/20* (2013.01); *H04W 8/205* (2013.01); *H04W 12/06* (2013.01); *H04W 88/02* (2013.01)

(58) Field of Classification Search
CPC ......... H04L 9/30; H04L 67/306; H04L 67/34; H04L 29/08; H04L 12/06
See application file for complete search history.

(56) References Cited

U.S. PATENT DOCUMENTS

| | | | |
|---|---|---|---|
| 2003/0032417 A1* | 2/2003 | Minear | G06F 8/62 |
| | | | 455/419 |
| 2004/0132469 A1 | 7/2004 | Jun | |
| 2009/0031220 A1* | 1/2009 | Tranchant | G09G 5/225 |
| | | | 715/719 |
| 2009/0191843 A1 | 7/2009 | Mardiks | |
| 2010/0037047 A1 | 2/2010 | Varriale et al. | |
| 2011/0306318 A1* | 12/2011 | Rodgers | H04L 67/16 |
| | | | 455/410 |
| 2012/0190354 A1 | 7/2012 | Merrien et al. | |
| 2012/0260086 A1 | 10/2012 | Haggerty et al. | |
| 2012/0260090 A1 | 10/2012 | Hauck et al. | |
| 2013/0227646 A1 | 8/2013 | Haggerty et al. | |
| 2013/0339305 A1 | 12/2013 | Kim et al. | |
| 2013/0339306 A1 | 12/2013 | Kim et al. | |
| 2015/0289129 A1 | 10/2015 | Li et al. | |
| 2015/0312699 A1 | 10/2015 | Rodgers et al. | |
| 2015/0381525 A1* | 12/2015 | Roese | H04W 4/02 |
| | | | 709/226 |
| 2016/0014280 A1 | 1/2016 | Brunsman et al. | |
| 2017/0045364 A1* | 2/2017 | Trivedi | G01C 21/3679 |
| 2017/0265059 A1* | 9/2017 | Wozniak | H04B 1/3816 |

FOREIGN PATENT DOCUMENTS

| | | |
|---|---|---|
| CN | 103329501 A | 9/2013 |
| CN | 105022969 A | 11/2015 |
| KR | 10-2012-0113686 A | 10/2012 |
| KR | 10-2012-0113690 A | 10/2012 |
| KR | 10-2013-0141370 A | 12/2013 |
| KR | 10-2013-0141371 A | 12/2013 |
| KR | 10-2014-0024796 A | 3/2014 |
| KR | 10-2014-0103892 A | 8/2014 |
| KR | 10-2014-0107168 A | 9/2014 |
| KR | 10-2014-0129161 A | 11/2014 |
| WO | 2011/136764 A1 | 11/2011 |
| WO | 2014/030893 A1 | 2/2014 |

* cited by examiner

DOWNLOADING PROFILES CORRESPONDING TO SUBSCRIBER IDENTIFICATION MODULES IN ELECTRONIC DEVICE

CLAIM OF PRIORITY

This application is a U.S. National Stage application under 35 U.S.C. § 371 of an International application filed on Jan. 13, 2017 and assigned application number PCT/KR2017/000459, which claimed the benefit of a Korean patent application filed on Mar. 21, 2016 in the Korean Intellectual Property Office and assigned Serial number 10-2016-0033670, the entire disclosure of which is hereby incorporated by reference.

Technical Field

The present disclosure relates generally to an electronic device for downloading a profile and a method of controlling an electronic device and, more particularly, to an electronic device for downloading a profile for service provision and a method of controlling an electronic device.

BACKGROUND

A Universal Integrated Circuit Card (hereinafter referred to as a "UICC") is a smart card used while inserted into a mobile communication terminal, and may store personal information such as the network access authentication information of a mobile communication subscriber, a phone number address, or a Short Message Service (hereinafter referred to as an "SMS"). Further, a UICC enables the use of stable mobile communication by authenticating a subscriber and generating a traffic security key that grants access to a mobile communication network such as Global System for Mobile communications (hereinafter referred to "GSM"), Wideband Code Division Multiple Access (hereinafter referred to as "WCDMA"), or Long Term Evolution (hereinafter referred to as "LTE").

The UICC has a communication application installed therein such as a Subscriber Identification Module (hereinafter referred to as a "SIM"), a Universal SIM (hereinafter referred to as a "USIM"), or an internet protocol multimedia SIM and it provides a high level security function for installing various applications such as an electronic wallet, an electronic passport, and ticketing services.

SUMMARY

As described above, when an electronic device lacks the memory to download a new profile to the convention eUICC, the user is required to delete unnecessary profiles directly, search profiles stored in existing memory, and check information on found profiles individually in order to delete unnecessary profiles.

An embodiment of the present disclosure provides a method and an apparatus for downloading a profile on a wireless communication system.

An embodiment of the present disclosure provides a method and an apparatus for downloading a profile to provide a communication service in a wireless communication system.

An embodiment of the present disclosure provides a method and an apparatus for downloading a profile by acquiring information on a server in a wireless communication system.

An embodiment of the present disclosure provides a method and an apparatus for downloading a profile by receiving profile information from a server in a wireless communication system.

An embodiment of the present disclosure provides a method and an apparatus for remotely downloading profile information to a terminal including an eUICC in a wireless communication system.

An embodiment of the present disclosure provides a method and an apparatus for remotely downloading a profile to a communication service provider for the purpose of subscribing to a wireless communication service by remotely installing profile information such as a subscriber identifier and an encryption key (K) in a terminal including an eUICC in a wireless communication system.

An embodiment of the present disclosure provides a method and an apparatus for transmitting/receiving a profile to provide a communication service in a wireless communication system.

An embodiment of the present disclosure provides a method and an apparatus for opening an eUICC terminal through the terminal of a mobile communication service provider in a mobile communication service provider's agency.

Another embodiment of the present disclosure provides a method and an apparatus for opening an eUICC terminal by a terminal.

According to various embodiments of the present disclosure, an electronic device includes: a communication module; memory that includes a secure area for storing one or more profiles corresponding to one or more Subscriber Identity Modules (SIMs), and a processor; wherein the processor is configured to acquire a request for storing another profile in the memory, to delete at least one of the profiles from the memory, or move at least one profile to other memory that includes another secure area operationally connected to the electronic device in response to the request.

According to various embodiments of the present disclosure, a method of controlling an electronic device including memory that includes a secure area for storing one or more profiles corresponding to one or more Subscriber Identity Modules (SIMs) and a processor includes: acquiring a request for storing another profile in the memory, deleting at least one of the profiles from the memory, or moving at least one profile to other memory that includes another secure area operationally connected to the electronic device in response to the request.

Advantageous Effects

An embodiment of the present disclosure has the effect of efficiently managing the memory of an eUICC.

An embodiment of the present disclosure has the advantage of easily reading information on a plurality of profiles stored in the memory of the eUICC.

An embodiment of the present disclosure has the effect of identifying an unnecessary profile according to a preset priority of information on a plurality of profiles stored in the memory of the eUICC or according to a user's use pattern learned by a terminal.

An embodiment of the present disclosure has the effect of efficiently opening an eUICC terminal and changing a device, as well as flexibly operating a profile management server for downloading a profile.

An embodiment of the present disclosure has the effect of remotely and flexibly installing a profile of a communication service provider in an eUICC terminal and managing the installed profile.

An embodiment of the present disclosure has the effect of downloading a profile in a wireless communication system.

An embodiment of the present disclosure has the effect of downloading a profile to provide a communication service in a wireless communication system.

An embodiment of the present disclosure has the effect of downloading a profile by acquiring information on a server in a wireless communication system.

An embodiment of the present disclosure has the effect of downloading a profile by receiving profile information from a server in a wireless communication system.

An embodiment of the present disclosure has the effect of remotely downloading profile information to a terminal including an eUICC in a wireless communication system.

An embodiment of the present disclosure has the effect of remotely downloading a profile to a communication service provider for the purpose of subscribing to a wireless communication service by remotely installing profile information including a subscriber identifier and an encryption key (K) in a terminal, including an eUICC in a wireless communication system.

An embodiment of the present disclosure has the effect of transmitting/receiving a profile to provide a communication service in a wireless communication system.

An embodiment of the present disclosure has the effect of opening an eUICC terminal through a terminal of a mobile communication service provider in a mobile communication service provider's agency.

An embodiment of the present disclosure has the effect of opening an eUICC terminal by a terminal.

DETAILED DESCRIPTION

Figure 1:
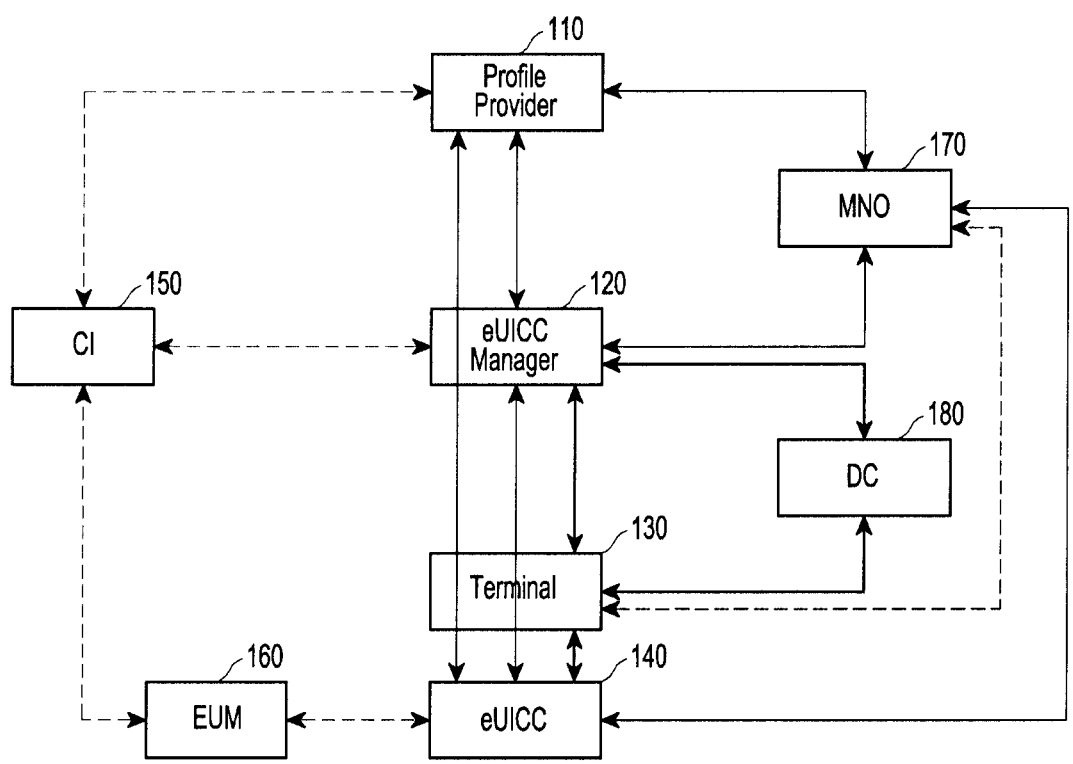
FIG. 1 schematically illustrates an example of a structure of a wireless communication system according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

First, a wireless communication system according to various embodiments of the present disclosure will be described with reference to FIGS. 1 to 7.

The terms used in this specification will first be described. The terms used in embodiments of this specification may be defined according to the terms used by those skilled in the art but, in the case of matters related to embodiments of this specification, the operation or features thereof may be described depending on the terms used in this specification. Further, in embodiments of the present disclosure, it should be noted that an embedded Universal Integrated Circuit Card (hereinafter referred to as an "eUICC") may be fixed to and inserted into a terminal and may be attachable and detachable like the existing Universal Integrated Circuit Card (hereinafter referred to as a "UICC") but is operationally the same as the eUICC.

A UICC according to an embodiment of the present disclosure is a smart card used while inserted into a mobile communication terminal, and may store personal information such as the network access authentication information of a mobile communication subscriber, a phone number address, or a Short Message Service (hereinafter referred to as an "SMS"). Further, a UICC enables the use of stable mobile communication by authenticating a subscriber and generating a traffic security key that grants access to a mobile communication network such as Global System for Mobile communications (hereinafter referred to "GSM"), Wideband Code Division Multiple Access (hereinafter referred to as "WCDMA"), and Long Term Evolution (hereinafter referred to as "LTE").

The UICC has a communication application installed therein such as a Subscriber Identification Module (hereinafter referred to as a "SIM"), a Universal SIM (hereinafter referred to as a "USIM"), or an Internet Protocol (IP) multimedia SIM (hereinafter referred to as an "ISIM") and provides a high level security function for installing various applications such as an electronic wallet, an electronic passport, and ticketing services.

According to an embodiment of the present disclosure, it is assumed that the eUICC is a security module in the form of a chip that is embedded into the terminal and cannot be detached, but may be manufactured in the form of the existing UICC so that it may be detached. Accordingly, as long as the UICC has the same functions, electrical, and software characteristics as those of the eUICC, does not have a functional difference, and with only difference being that the UICC can be detached, an embodiment of the present disclosure can be equally applied thereto.

Further, an embodiment of the present disclosure can be applied to the operation of the eUICC manufactured in the form of the UICC. The eUICC may download and install a profile through a normal Internet Protocol (hereinafter referred to as an "IP") network such as a wireless communication network or Wireless Fidelity (WiFi). According to an embodiment of the present disclosure, there is no limitation to the type of network through which the profile is downloaded.

According to an embodiment of the present disclosure, it should be noted that the profile is obtained by packaging, for example, at least one of an application stored in the UICC, a file system, or an authentication key value in the software form.

According to an embodiment of the present disclosure, a USIM profile may be interchangeably used with a profile or packaging of information included in a USIM application within the profile in the software form.

According to an embodiment of the present disclosure, it should be noted that a profile provider may be expressed as Subscription Manager Data Preparation (hereinafter referred to as "SM-DP"), a profile provision server, an off-card entity of profile domain, a profile encryption server, a profile generation server, or a profile provisioner.

According to an embodiment of the present disclosure, it should be noted that an eUICC manager may be expressed as Subscription Manager Secure Routing (hereinafter referred to as "SM-SR"), a profile management server, an off-card entity of eUICC Profile Manager), or a Profile Manager.

According to an embodiment of the present disclosure, it should be noted that a Discovery Center (hereinafter referred to as a "DC") may be expressed as a Discovery & Push Function (hereinafter referred to as a "DPF"), an Address Resolution Server (hereinafter referred to as "ARS"), a discovery server, a discover function, or an event delivery function.

The term "terminal" used in this specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terms. Various embodiments of a terminal may include a cellular phone, a smart phone that has a wireless communication function, a personal digital assistant (PDA) that has a wireless communication function, a wireless modem, a portable computer that has a wireless communication function, a photographing device, such as a digital camera that has a wireless communication function, a gaming device that has a wireless communication function, a home appliance for storing and reproducing music that has a wireless communication function, an Internet home appliance capable of wirelessly accessing and browsing the Internet, and portable units or terminals that have integrated combinations of the functions thereof. In addition, the terminal may also include a measurement device and the like with a communication function.

According to an embodiment of the present disclosure, the terminal may include a Machine to Machine (M2M) terminal or a Machine Type Communication (MTC) terminal/device, but is not limited thereto.

According to an embodiment of the present disclosure, a profile delimiter may be referred to as a factor that matches a Profile Identifier (ID), an Integrated Circuit Card ID (ICCID), or an Issuer Security Domain-Profile (ISD-P). A profile ID may represent a unique identifier of each profile. According to an embodiment of the present disclosure, an eUICC delimiter may be a unique identifier of the eUICC embedded into the terminal and may be referred to as an eUICC ID (EID). The profile delimiter may be used for identifying a profile over the network.

An example of the internal structure of the wireless communication system according to an embodiment of the present disclosure will be described with reference to FIG. 1.

FIG. 1 schematically illustrates an example structure of a wireless communication system according to an embodiment of the present disclosure.

Particularly, the wireless communication system illustrated in FIG. 1 is an example of wireless communication systems for remotely transmitting/receiving a profile for the purpose of providing a communication service according to an embodiment of the present disclosure.

Referring to FIG. 1, the wireless communication system may include at least one of a terminal 130, an eUICC 140, an eUICC Manager 120, a Profile Provider 110, a Certificate Issuer (CI) 150, a DC 180, a Mobile Network Operator (MNO) 170, an e UICC Manufacturer system (EUM) 160. The CI 150 may be named Certificate Authority (hereinafter referred to as "CA").

According to an embodiment of the present disclosure, the terminal 130, in order to access a wireless communication network, may transmit/receive a signal to/from the eUICC 140 to install a profile, select an installed profile, or delete the installed profile or may initialize the configuration of the eUICC 140 and the profile.

The eUICC 140 may transmit/receive a signal to/from the terminal 130 to install a profile, select a profile, delete a profile, or initialize the configuration of the eUICC 140 and the profile.

The eUICC 140 may store a CI public key or a CI certificate, store a certificate and a private key of the eUICC 140, and authenticate the Profile Provider 110 as possessing a certificate and a private key issued by the same CI 150 and a sub CI 150 thereof based on the certificate and the private key of the eUICC 140.

The eUICC 140 may authenticate the eUICC Manager 120 as possessing a certificate and a private key issued by the IC 150 corresponding to the possessed CI public key and a sub CI 150 thereof.

The eUICC 140 may store a plurality of CI public keys or CI certificates and use the plurality of CI public keys or CI certificates for authentication.

Further, the eUICC Manager 120 may transmit/receive a signal to/from the DC 180 to deliver information required for initiating a profile download.

In addition, the eUICC Manager 120, in managing the eUICC 140, may perform an authority verification operation based on a certificate. At this time, the eUICC Manager certificate may identify the MNO 170 or a business entity, such as a terminal manufacturer, and the eUICC 140 may verify an eUICC 140 management operation performed by the eUICC Manager 120 based on the eUICC Manager certificate.

Further, the eUICC Manager 120 may perform a profile management operation. For example, the profile management operation may include a profile management operation such as profile download, profile enable, profile disable, and profile deletion.

In addition, the Profile Provider 110 generates a profile package and performs an encryption operation.

The DC 180 may perform an operation to help search for the eUICC Manager 120 to which the eUICC 140 is connected in order to process an event to manage the waiting eUICC 140 and to transfer the eUICC 140 management event to the eUICC 140 in a push type over an IP network.

Further, the terminal 130 may transmit/receive a signal to/from the DC 180 to transmit/receive information required for initiating a profile download.

According to an embodiment of the present disclosure, the profile may include, for example, a subscriber identity (for example, an International Mobile Subscriber Identity (hereinafter referred to as an "IMSI")) of the terminal 130 and an encryption key (for example, K) for authentication, and may further include various pieces of information for a communication service provided by a corresponding communication service provider. Various pieces of information for the communication service have no specific limitation.

According to various embodiments, the CI 150 may be configured to issue certificates to the Profile Provider 110, the eUICC Manager 120, and the EUM 160.

According to various embodiments, the EUM 160 may manufacture the eUICC 140 based on the certificate issued by the CI 150.

FIG. 1 illustrates an example of the structure of the wireless communication system according to an embodiment of the present disclosure, and another example of the structure of the wireless communication system according to an embodiment of the present disclosure will be described next with reference to FIG. 2.

Figure 2:
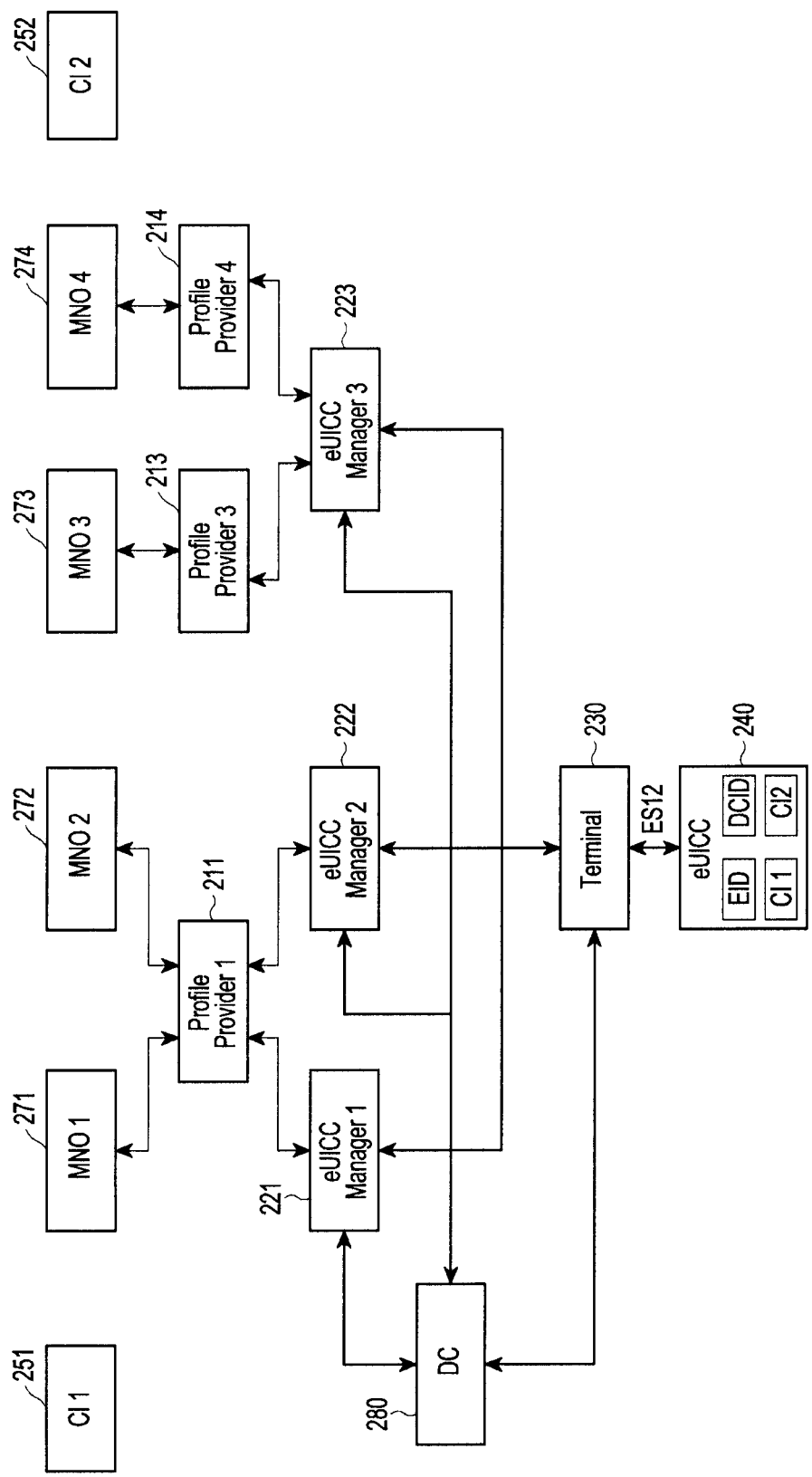
FIG. 2 schematically illustrates another example of the structure of the wireless communication system according to an embodiment of the present disclosure.

FIG. 2 schematically illustrates another example of the structure of the wireless communication system according to an embodiment of the present disclosure.

Referring to FIG. 2, a plurality of MNO systems, for example, MNO #1 271, MNO #2 272, MNO #3 273, and MNO #4 274 may individually interwork with Profile Provider #1 211, Profile Provider #3 213, or Profile Provider #4 214. At this time, Profile Provider #1 211, Profile Provider #3 213, or Profile Provider #4 214 may individually interwork with one MNO Business-Support-System (hereinafter referred to as a "BSS") or a plurality of MNO BSSs.

Further, eUICC Manager #1 221, eUICC Manager #2 222, or eUICC Manager #3 223 may individually interwork with one of Profile Provider #1 211, Profile Provider #3 213, and Profile Provider #4 214 or a plurality of Profile Provider #1 211, Profile Provider #3 213, and Profile Provider #4 214.

Additionally, one terminal 230 may interwork with a plurality of eUICC Manager #1 221, eUICC Manager #2 222, and eUICC Manager #3 223. At this time, the eUICC 240 may store a plurality of CI certificates or CI public keys to authenticate eUICC Manager #2 222, eUICC Manager #3 223, provider #1 211, Profile Provider #3 213, or Profile Provider #4 214 issued directly by the corresponding CI (CI #1 251 or CI #2 252) or issued through the sub CI.

Further, the DC 280 may provide a function of selecting eUICC Manager #2 222 or eUICC Manager #3 223 required for the terminal 230 by interworking with a plurality of eUICC Manager #1 221, eUICC Manager #2 222, and eUICC Manager #3 223. At this time, a push type of storing required information in the DC 280 and then directly informing the terminal 230 of the required information, or a pull type in which the terminal 230 reads information stored in the DC 280, is possible.

Although FIG. 2 illustrates another example of the internal structure of wireless communication according to an embodiment of the present disclosure, and an example of a profile download procedure in the wireless communication system according to an embodiment of the present disclosure will be next described with reference to FIG. 3.

Figure 3:
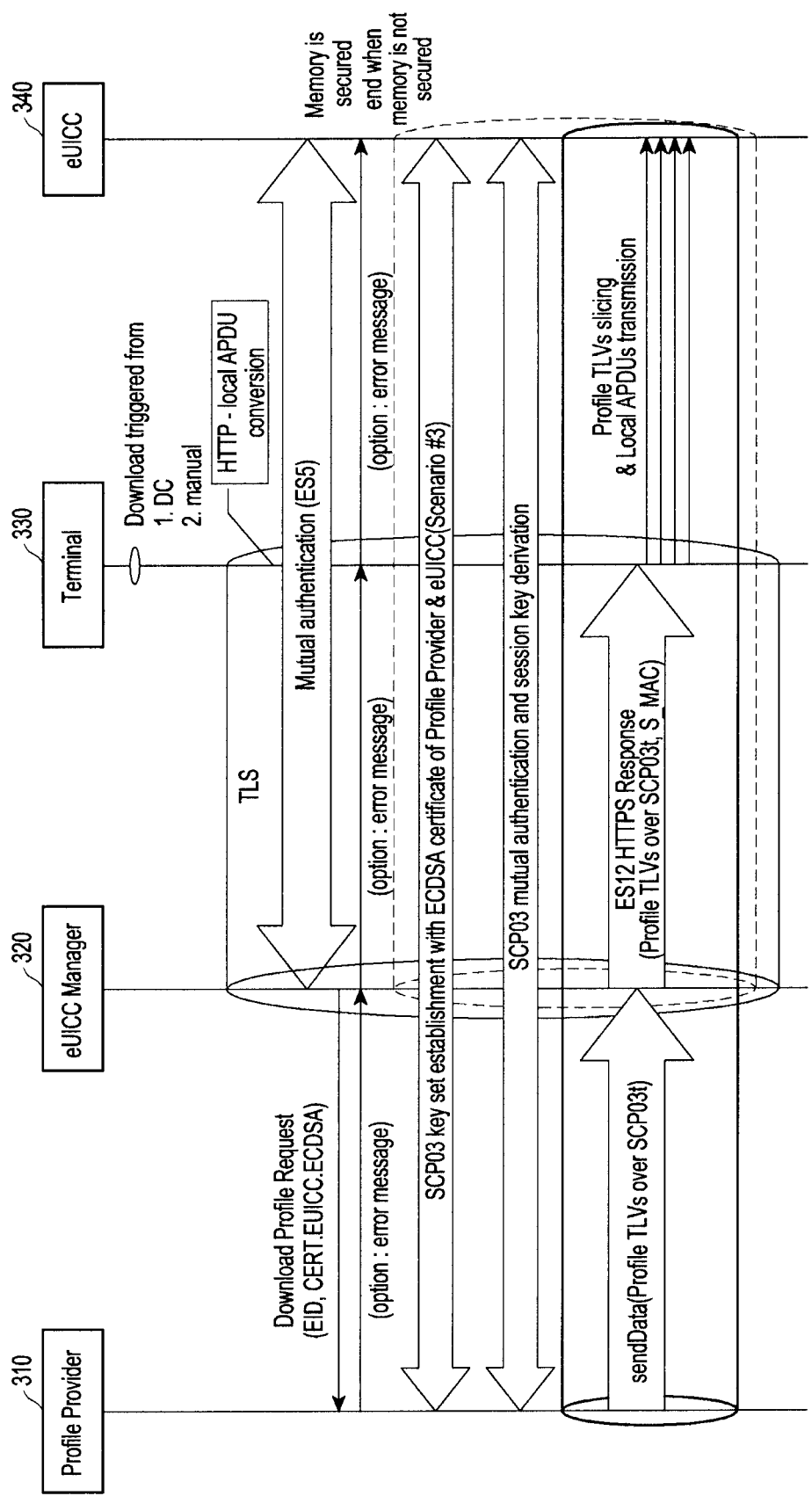
FIG. 3 schematically illustrates an example of the profile download procedure in the wireless communication system according to an embodiment of the present disclosure.

FIG. 3 schematically illustrates an example of the profile download procedure in the wireless communication system according to an embodiment of the present disclosure.

Referring to FIG. 3, the wireless communication system includes a Profile Provider 310, an eUICC Manager 320, a terminal 330, and an eUICC 340.

First, the profile download of the terminal 330 may be started when the DC (for example, the DC 280) first informs the terminal 330, selected when the user controls the terminal 330, or is initiated based on information which the terminal 330 first makes a request to the DC 280 for and receives. The information which the terminal 330 first makes a request to the DC 280 for and receives may include an address of the eUICC Manager 320 and a delimiter indicating the initiation of the profile download.

After a mutual authentication process, the eUICC Manager 320 may transfer a download profile request message to the Profile Provider 310. The download profile request message may include an EID, an eUICC certificate, and eUICC_Info.

The Profile Provider 310, having received the download profile request message from the eUICC Manager 320, verifies a profile capacity and version through the eUICC_Info corresponding to the EIC included in the download profile request message. When the verification fails, the Profile Provider 310 transfers an error message to the eUICC Manager 320. The eUICC Manager 320 analyzes the error message and, when there is a lack of memory, the eUICC Manager 320 transmits an error response (or event response) to the terminal 330. When the terminal 330, having received the error response, informs the user of error content (error_memory) and when the user receives a delete success response indicating that the eUICC 340 completely deletes the profile after transmitting a profile delete request to the eUICC 340 through the terminal 330, the terminal 330 again transmits a GetAuthDataRequest to the eUICC 340 to make a request for eUICC_Info (at this time, the operation after S_NONCE Signing Response may be repeated or the operation after E_NONCE request may be repeated) and transmits the received eUICC_Info to the eUICC Manager 320 to initiate the authentication procedure again. At this time, the terminal 330 may make a request for the currently stored profile to the eUICC 340 to identify the user or the terminal 330 may have profile information currently stored in a predetermined space. The terminal 330 may show a deletion priority list to allow the user to identify deletion based on user patterns such as use frequency (in the order of an amount of use or a time of use), an RSSI value (in the order of a lower value), a place of use (in the case of away based on HLR), a time point of final use, or MNO type, the case in which profile price is high and surrounding information is collected by the terminal 330. When the user does not want to delete the profile, that is, when the user cancels a new profile download, the terminal 330 transmits an event result of the canceled download to the eUICC Manager 320 and the eUICC Manager 320 makes a request to delete an event to the DC 280 and informs the MNO (for example, the MNO 170) and the Profile Provider 310 of the canceled download and finishes a download action. When the Profile Provider 310 transmits an error message to the eUICC Manager 320, the eUICC Manager 320 may finish the download action by transmitting an error response to the terminal 330 and deleting the event registered to the DC 280. At this time, the terminal 330 displays error content after receiving the error response. When there is a shortage of memory capacity, the terminal 330 displays a profile deletion priority list to make a request to secure the memory capacity and then, when a profile download request is made in a state in which the memory capacity is not secured, provides a warning message.

The eUICC Manager 320, having received the error message, may finish the download action without making an event deletion request to the DC 280. Accordingly, the profile download process may restart when the memory capacity is secure by displaying the profile deletion priority list and making a request to secure the memory capacity. Therefore, the eUICC Manager 320 may reduce the process of registering the event in the DC 280, thereby decreasing resource consumption and increasing convenience.

In the above description, when there is a shortage of memory, a deletion list, in which the existing profiles are arranged according to priority, is provided and the memory space is secured through the deletion. However, according to an embodiment, it is possible to secure the memory space by moving the existing profile to another pre-authenticated secure memory. For example, the terminal 330 receiving the error response may show information on installed profiles, arranged in a list form according to priority, to the user and the user may select a profile to be moved from the current terminal 330 to an authenticated external secure memory and may transfer information (for example, an EID, device information, or server information) of the secure memory to which the profile is moved to the MNO 170 so as to perform a profile movement operation between devices. Additionally, the MNO may download the profile to the secure memory or make a deletion request for the existing profile.

Meanwhile, when the Profile Provider 310 succeeds in verifying eUICC_Info, in order to generate the same SCP03 key set as that of the eUICC 340, a mutual authentication process may be performed based on a certificate (SCP03 key set establishment with ECDSA certificate of profile & eUICC(Scenario #3)). More specifically, the mutual authentication process and the SCP03 key set creation process may be processes similar to the Scenario #3 process introduced in Global Platform Card Security Upgrade for Card Content Management Card Specification v2.2—Amendment E V1.0 standard or the Scenario #3 process mentioned in GSMA Remote Provisioning Architecture for Embedded UICC Technical Specification Version 1.0, and thus a detailed description thereof will be omitted.

Meanwhile, according to the mutual authentication process and the SCP key set creation process, the same symmetric key set is generated in the Profile Provider 310 and the eUICC 340.

When an update initialization (hereinafter referred to as an "INITIALIZE UPDATE") command and an external authentication (hereinafter referred to as "EXTERNAL AUTHENTICATE") command are transmitted to the eUICC 340 through the key set after the same symmetric key set is generated in the Profile Provider 310 and the eUICC 340, the SCP03 session may be created.

Thereafter, the Profile Provider 310 may perform an encrypted communication using a session key set generated when the SCP03 session is created. The Profile Provider 310 may generate profile information in the form of Tag, Length, and Value (TLV). The TLV data may be protected using one or more protection methods among encryption and integrity protection. Here, the protection method may be a protection method using the session key set generated when the SCP03 session is created. The Profile Provider 310 may transmit the profile information in the TLV form to the eUICC Manager 320. At this time, the profile information may be included in a data transmission (hereinafter referred to as "sendData") message.

The eUICC Manager 320 having received the profile information in the TLV form from the Profile Provider 310 may transfer information (ES12, HTTPS Response (Profile TLVs over SCP03t, S_MAC)), including some or all of the profile information to the terminal 330. It is assumed that the eUICC Manager 320 transfers the profile information received from the Profile Provider 310 to the terminal 330 without any change in FIG. 3.

The terminal 330 having received the profile information from the eUICC Manager 320 partitions the profile information into data with a data size that can be transmitted to the eUICC 340, and then inserts the partitioned data into a profile load (hereinafter referred to as "PROFILE LOAD") command and transfers the PROFILE LOAD command to the eUICC 340.

The eUICC 340 may receive at least one PROFILE LOAD command from the terminal 330, perform a decoding and integrity verification operation, and then install the profile. In FIG. 3, it is assumed that the eUICC 340 receives a plurality of PROFILE LOAD commands from the terminal 330.

Although not illustrated in FIG. 3, the eUICC 340 may perform the decoding and integrity verification operation and complete the profile download and installation after receiving all of the plurality of PROFILE LOAD commands, or may complete the profile download and installation after sequentially receiving the plurality of PROFILE LOAD commands.

During the profile download process, the profile process of performing mutual authentication between the Profile Provider 310 and eUICC 340, generating a key, creating an SCP03 session, and transmitting profile information using an SCP03 session key set may be sequentially performed as illustrated in FIG. 3, but the Profile Provider 310 may acquire a certificate of the eUICC 340, transfer pre-generated APDU and encrypted profile information to the eUICC Manager 320, and then store all of them in the terminal 330, and, thereafter, the terminal 330 may transfer the APDU and encrypted profile information to the eUICC 340 in the unit of APDUs.

Meanwhile, FIG. 3 illustrates an example of the profile download process in the wireless communication system according to an embodiment of the present disclosure; various modifications can be made in FIG. 3. For example, although successive steps are illustrated in FIG. 3, the steps illustrated in FIG. 3 may overlap with each other, may be performed in parallel, may be performed in a different order, or may be performed several times.

A terminal 430 first initiates a mutual authentication process between an eUICC Manager 420 and an eUICC 440. The mutual authentication process performed between the terminal 430 and the eUICC Manager 420 will be described with reference to FIG. 4.

Figure 4:
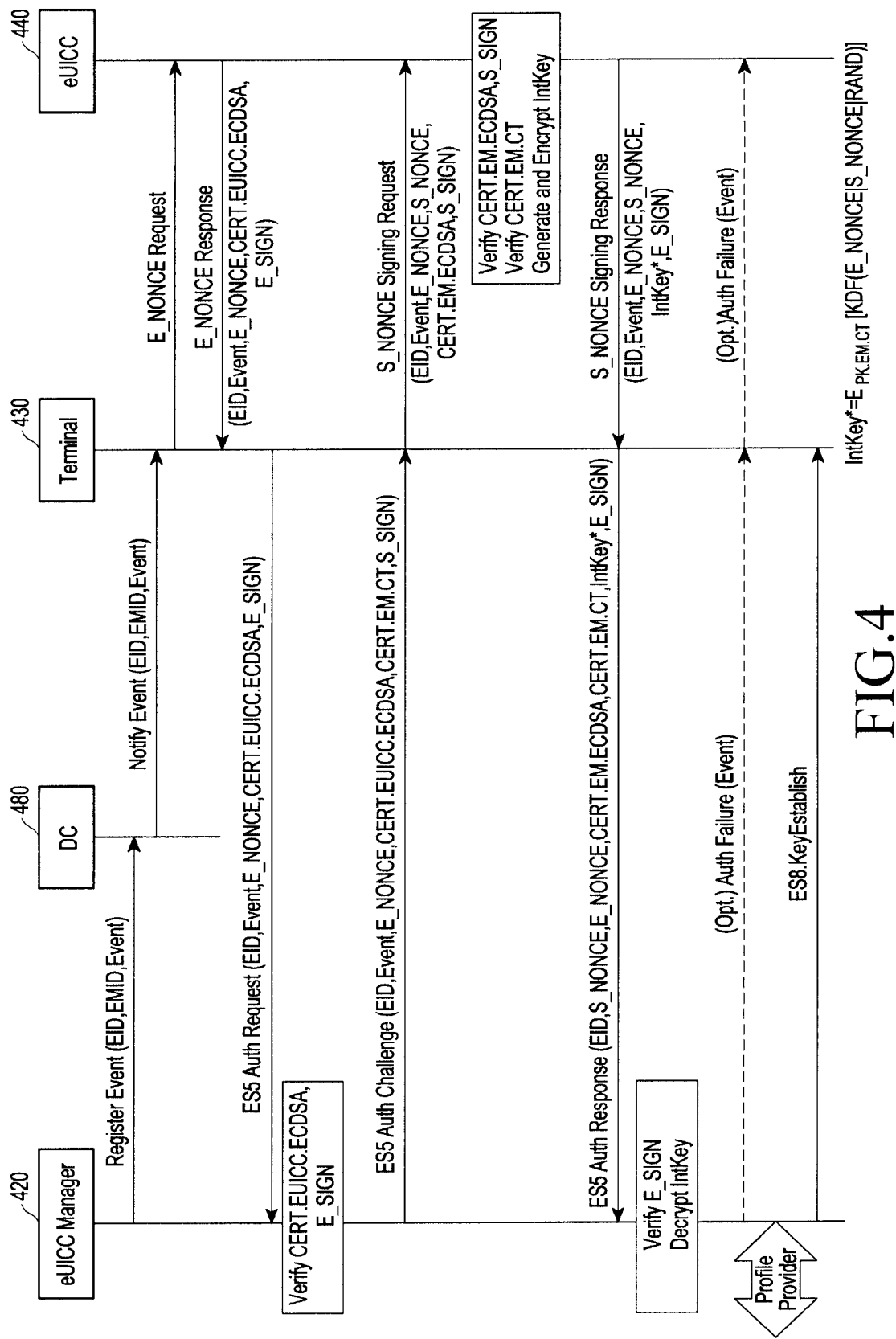
FIG. 4 schematically illustrates the mutual authentication process performed between the eUICC manager 420 and the eUICC 440 in the wireless communication system according to an embodiment of the present disclosure.

FIG. 4 schematically illustrates the mutual authentication process performed between the eUICC Manager 420 and the eUICC 440 in the wireless communication system according to an embodiment of the present disclosure.

Referring to FIG. 4, first, the wireless communication system includes the eUICC Manager 420, a DC 480, the terminal 430, and the eUICC 440.

The eUICC Manager 420 transfers a register event (hereinafter referred to as a "Register Event") message to the DC 480, wherein the Register Event message includes an eUICC identifier (hereinafter referred to as an "EID"), address information of the eUICC Manager 420, or an identifier of the eUICC Manager 420 (hereinafter referred to as an "EMID"). Here, the Register Event message may include an event indicating initiation of the profile download.

The DC 480, receiving the Register Event message from the eUICC Manager 420, may store information included in the Register Event message, for example, the EID, the EMID, and the event, and transfer an event notification (hereinafter referred to as "Notify_Event") message to the terminal 430. Here, the Notify_Event message may include an EID, an EMID, and an event.

The terminal 430, receiving the Notify_Event message from the DC 480, may transfer an E_NONCE request (hereinafter referred to an "E_NONCE Request") message to the eUICC 440. The E_NONCE Request message may be transferred to the eUICC 440 in the form of an Application Protocol Data Unit (APDU) command.

The eUICC 440 receiving the E_NONCE Request message from the terminal 430 generates E_NONCE, which is a random value, and transfers an E_NONCE response (hereinafter referred to an "E_NONCE Response") message including eUICC_Info on eUICC spec. such as an EID, an Event, a certificate of the eUICC 440, an available memory capacity and the version, and an E_SIGN value signed using a private key of the eUICC 440 to the terminal 430. The eUICC_Info on the eUICC spec., such as the available memory capacity and the version, may not be transmitted in the following step according to the circumstances.

The terminal 430, receiving the E_NONCE Response message from the eUICC 440, may transfer an ES5 authentication request (hereinafter referred to as an "ES5 Auth Request") message to the eUICC Manager 420 through the E_NONCE Response message received from the eUICC 440. The ES5 Auth Request message which the terminal 430 transfers to the eUICC Manager 420 may include some or all of the E_NONCE RESPONSE messages received from the eUICC 440. The form in which the E_NONCE RESPONSE message is included in the ES5 Auth Request message may vary.

The eUICC Manager 420, receiving the ES5 Auth Request message from the terminal 430, may verify the certificate and signature included in the received ES5 Auth Request message through one of the certificates of the CI and the public key of the CI stored in the eUICC Manager 420. Then, the eUICC Manager 420 may generate a random S_NONCE value and transfer an ES5 authentication attempt (hereinafter referred to as "ES5 Auth Challenge") message, including the certificate of the eUICC Manager 420 and a signature value S_SIGN of the eUICC Manager 420, to the terminal 430.

The S_SIGN is a value obtained by signing information including the EID, the E_NONCE, and the S_NONCE through the private key of the eUICC Manager 420.

The terminal 430, receiving the ES5 Auth Challenge message from the eUICC Manager 420, may transfer an S_NONCE signature request (hereinafter referred to as an "S_NONCE Signing Request") message to the eUICC 440 through the ES5 Auth Challenge message received from the eUICC Manager 420. At this time, the S_NONCE Signing Request message, which the terminal 430 transfers to the eUICC 440, may include some or all of the ES5 Auth Challenge messages received from the eUICC Manager 420. Here, the form in which the ES5 Auth Challenge message is included in the S_NONCE Signing Request message may vary.

The eUICC 440 receiving the S_NONCE Signing Request message from the terminal 430 may verify the certificate of the eUICC Manager 420 included in the ES5 Auth Challenge message included in the S_NONCE Signing Request message through the certificate or the public key of the CI stored in the eUICC 440. Accordingly, when the certificate is successfully verified, the eUICC 440 verifies the S_SIGN value and the message through the public key included in the certificate of the eUICC Manager 420. The eUICC 440 performs an operation verifying whether or not the S_SIGN value is calculated using the public key of the eUICC Manager 420 and the E_NONCE value.

When the eUICC 440 fails the verification operation, the eUICC 440 transmits an S_NONCE signature response (hereinafter referred to as an "S_NONCE Signing Response") to the terminal 430. At this time, the S_NONCE Signing Response message may include a Status Word value indicating that the verification operation failed.

However, when the eUICC 440 succeeds in the verification operation, the eUICC 440 may transmit an S_NONSE Signing Response message, including eUICC_Info on eUICC spec. such as the available memory capacity and the version, to the terminal 430 and may complete the authentication operation on the eUICC Manager 420.

Here, the eUICC_Info on the eUICC spec., such as the available memory capacity and the version, may not be transmitted in the following step according to the circumstances.

Meanwhile, the S_NONCE Signing Response message may include a signature value E_SIGN obtained by signing information including the S_NONCE value through the private key of the eUICC. The information including the S_NONCE value may include IntKey*. Here, IntKey* may be a value obtained by encrypting an integrity protection (hereinafter referred to as "Integrity Protect") key used for the integrity verification through the public key of the certificate of the eUICC Manager 420 after the authentication process.

The terminal 430, receiving the S_NONCE Signing Response message from the eUICC 440, may transfer an ES5 Auth Response message, including some or all of the S_NONCE Signing Response messages, to the eUICC Manager 420. Here, the form in which the E_NONCE Response message is included in the ES5 Auth Response message may vary.

The eUICC Manager 420, receiving the ES5 Auth Response message from the terminal 430, may verify the E_SIGN value through the public key of the eUICC 440. When it is verified that the E_SIGN value is calculated using the private key of the eUICC 440 and the S_NONCE value, the eUICC Manager 420 may complete the authentication of the eUICC 440.

Further, the eUICC Manager 420 may extract an IntKey value by decrypting the IntKey* through the private key of the eUICC Manager 420. Thereafter, data which the eUICC Manager 420 transfers to the eUICC 440 through the terminal 430 may guarantee integrity protection through the IntKey value.

Meanwhile, when the eUICC Manager 420 fails verification, the eUICC Manager 420 may transfer an authentication failure (hereinafter referred to as "Auth Failure") message to the terminal 430. Here, the operation in which the eUICC Manager 420 transmits the Auth Failure message to the terminal 430 may be selectively performed.

The terminal 430, receiving the Auth Failure message from the eUICC Manager 420, may transfer the Auth Failure message, including the part or whole of the Auth Failure message, to the eUICC 440. Here, the form in which the Auth Failure message which the terminal 430 receives from the eUICC Manager 420 and is included in the Auth Failure message which the terminal 430 will transmit to the eUICC 440 may vary.

Meanwhile, after completing the authentication process, the eUICC Manager 420 may transmit a profile download request (hereinafter referred to as a "Download Profile Request") message, as illustrated in FIG. 3 by interworking with the Profile Provider.

Meanwhile, although FIG. 4 illustrates a mutual authentication process performed between the eUICC Manager 420 and the eUICC 440 in the wireless communication system, according to an embodiment of the present disclosure, various modifications can be made in FIG. 4. For example, although successive steps are illustrated in FIG. 4, the steps illustrated in FIG. 4 may overlap each other, may be performed in parallel, may be performed in a different order, or may be performed several times.

Subsequently, a process in which an MNO 570 downloads a profile to a terminal 530 in the wireless communication system, according to an embodiment of the present disclosure, will be described with reference to FIG. 5.

Figure 5:
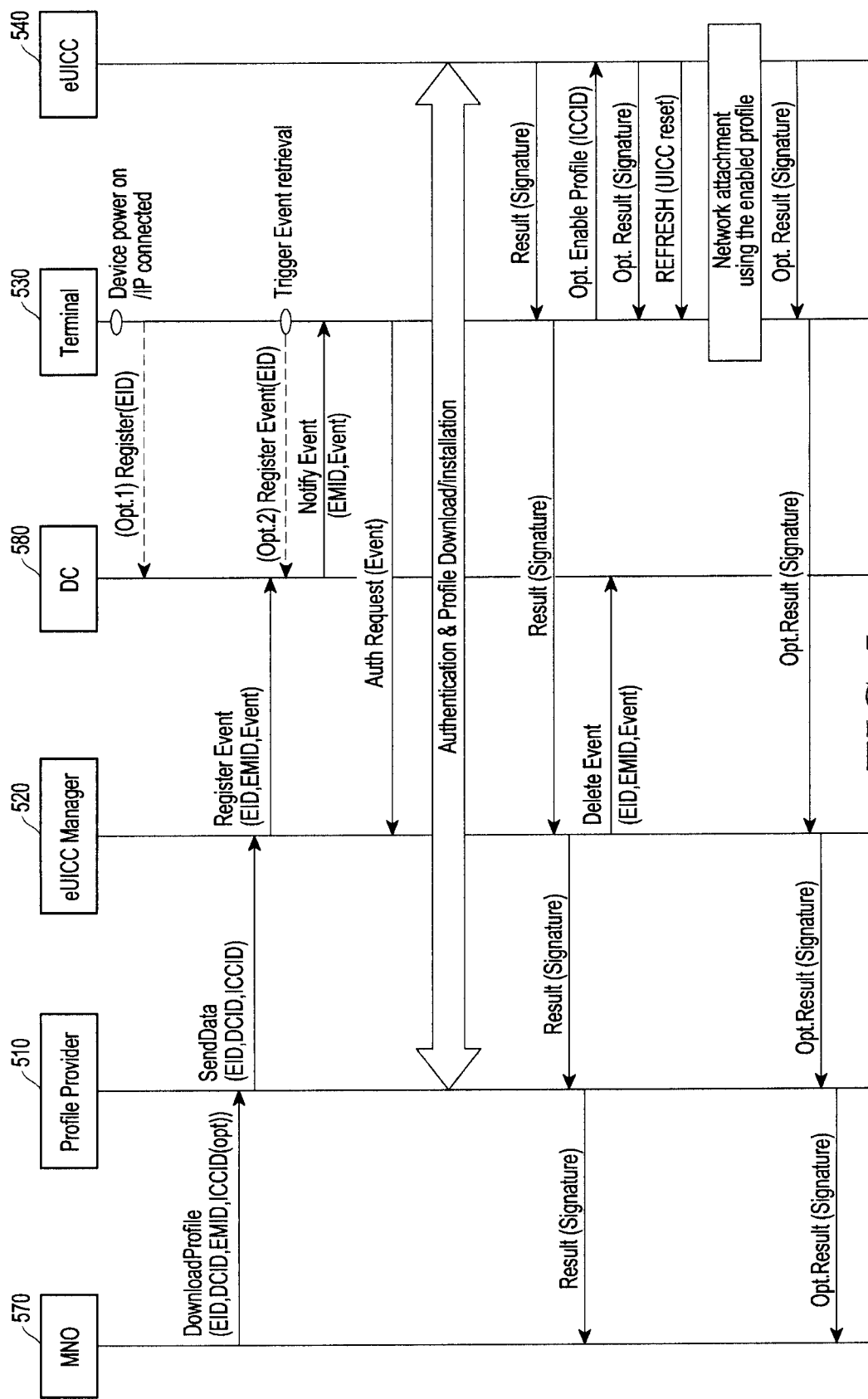
FIG. 5 schematically illustrates a process of downloading a profile to the terminal 530 from the MNO 570 in the wireless communication system according to an embodiment of the present disclosure.

FIG. 5 schematically illustrates a process of downloading a profile to the terminal 530 from the MNO 570 in the wireless communication system according to an embodiment of the present disclosure.

Referring to FIG. 5, the wireless communication system includes the MNO 570, a Profile Provider 510, an eUICC Manager 520, the terminal 530, and an eUICC 540. Referring to FIG. 5, the MNO 570 may transfer a profile download (hereinafter referred to "DownloadProfile") message to the Profile Provider 510 in order to initiate a profile download. The DownloadProfile message may include at least one of an EID, a DCID, an EMID, and a Profile ID.

The EID may denote an eUICC Identifier and may have a fixed length or a variable length.

The EID may be, for example, 16 digits.

The DCID may be a DC Identifier. The DCID may be a server address through the eUICC Manager 520 or the terminal 530 accesses the DC or a value that can be mapped to the server address.

The EMID may be an eUICC Manager Identifier. The EMID may be a server address through which the Profile Provider 510, the DC, the terminal 530, or the eUICC 540 accesses the eUICC Manager 520 or a value that can be mapped to the server address.

The Profile ID may be a delimiter that identifies a profile. Further, the Profile ID may be an ICCID.

The Profile Provider 510 may transfer a SendData message to the eUICC Manager 520, which corresponds to the EMID or which is preset, through the EID, the DCID, and the ICCID included in the DownloadProfile message.

The eUICC Manager 520 may identify the DCID included in the SendData message and transfer a Register Event message to the DC corresponding to the DCID. The Register Event message may include an EMID, an EID, and an Event.

The Event may be information including an Event ID and an event type (hereinafter referred to as an "Event Type").

The Event ID may be a delimiter for identifying an event and has a globally unique value.

The Event Type serves to identify an event such as profile download.

Thereafter, a method by which the DC transfers the EMID to the terminal 530 may be one of the following methods or both methods.

When there is an EID registered through a Register message from the terminal 530 (Opt. 1) or when a Retrieve Event message including an EID requesting an Event is received, the DC may transfer a Notify Event message to the terminal 530. The Notify Event message may include the EMID and the Event. The terminal 530 may perform an authentication by transferring an Auth Request message to the eUICC Manager 520 corresponding to the EMID. At this time, the Auth Request message may include an Event received from the eUICC Manager 520.

The eUICC Manager 520 may initiate an additional operation by identifying an Event ID or an EventType included in the received Event.

In FIG. 5, it is assumed that the Event is an Event type indicating a profile download.

Meanwhile, an operation for performing authentication and downloading/installing a profile is performed through interwork between the Profile Provider 510, the eUICC Manager 520, the terminal 530, and the eUICC 540. The process of performing authentication and downloading/installing the profile between the Profile Provider 510, the eUICC Manager 520, the terminal 530, and the eUICC 540 may be the process included in FIG. 5.

Thereafter, the eUICC 540 may transfer a result including a signature value of the eUICC 540 to the terminal 530, and the terminal 530 may transfer the result to the eUICC Manager 520. Further, the eUICC Manager 520 may transfer the result to the MNO 570 directly or through the Profile Provider 510.

Meanwhile, when the Event is completely processed, the eUICC Manager 520 may transfer a deletion event (hereinafter referred to as a "Delete Event") to the DC and the DC may delete the registered Event.

Thereafter, the terminal 530 may transfer a profile enable (hereinafter referred to as a "Enable Profile") message that has an ICCID value as a factor to the eUICC 540 and enable a profile that corresponds to the corresponding ICCID value.

After informing the terminal 530 of the Enable Profile message, when there is a conventionally enabled profile, the eUICC 540 may first disable the conventionally enabled profile and then enable the profile corresponding to the ICCID. After completing the corresponding operation, the eUICC 540 may transfer a REFRESH message to the terminal 530 and the terminal 530 may access a network through the newly enabled profile.

Thereafter, the eUICC 540 may transfer a network access result using the Enable Profile, including a signature value of the eUICC 540, to the terminal 530, and the terminal 530 may transfer the result to the eUICC Manager 520.

Further, the eUICC Manager 520 may transfer the result to the MNO 570 directly or through the Profile Provider 510.

Meanwhile, although FIG. 5 illustrates the process of downloading the profile to the terminal 530 from the MNO 570 in the wireless communication system, according to an embodiment of the present disclosure, various modifications can be made in FIG. 5. For example, although successive steps are illustrated in FIG. 5, the steps illustrated in FIG. 5 may overlap each other, may be performed in parallel, may be performed in a different order, or may be performed several times.

Various entities included in the wireless communication system according to an embodiment of the present disclosure, for example, the terminal 530, includes a transmitter, a controller, a receiver, and a storage unit.

First, the controller controls the overall operation of the terminal 530. The controller controls the terminal 530 to perform the overall operations related to the profile download operation according to an embodiment of the present disclosure.

The transmitter transmits various signals and various messages to an entity other than the terminal 530 under a control of the controller.

The receiver receives various signals and various messages from an entity other than the terminal 530 under a control of the controller.

The storage unit stores programs and various data required for the operation of the terminal 530, particularly, information related to the profile download operation according to an embodiment of the present disclosure. Further, the storage unit stores various signals and various messages which the receiver receives from an entity other than the terminal 530.

Meanwhile, although the case in which the terminal 530 is implemented by separate units such as the transmitter, the controller, the receiver, and the storage unit, the terminal 530 can be implemented in a form such that at least two of the transmitter, the controller, the receiver, and the storage unit are integrated into a single unit.

Next, another example of the profile download process in the wireless communication system, according to an embodiment of the present disclosure, will be described with reference to FIG. 6.

Figure 6:
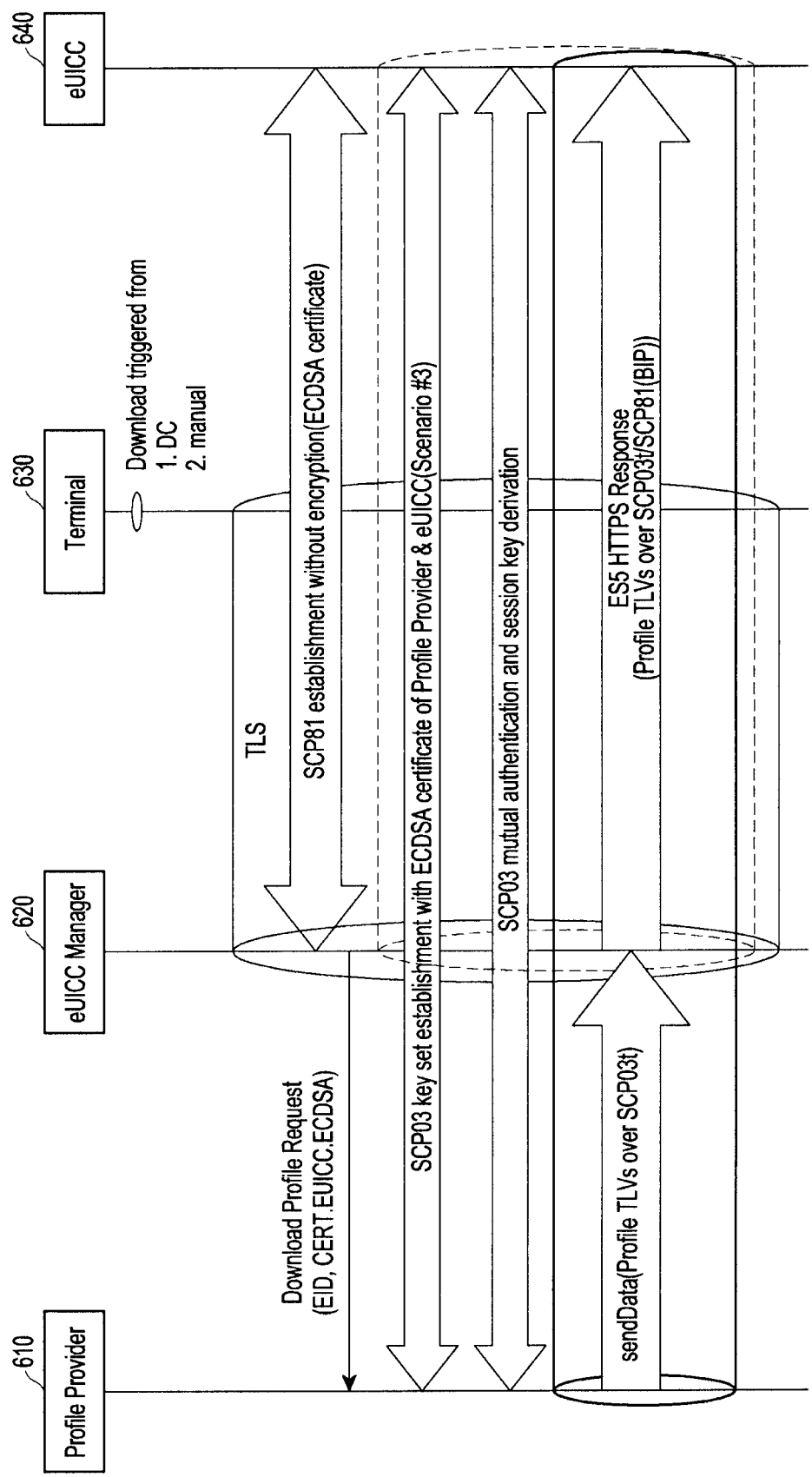
FIG. 6 schematically illustrates another example of the profile download process in the wireless communication system according to an embodiment of the present disclosure.

FIG. 6 schematically illustrates another example of the profile download process in the wireless communication system according to an embodiment of the present disclosure.

Referring to FIG. 6, the wireless communication system includes a Profile Provider 610, an eUICC Manager 610620, a terminal 630, and an eUICC 640.

The profile download process illustrated in FIG. 6 uses an SCP 81 protocol in order to perform mutual authentication between the eUICC Manager 620 and the eUICC 640 and integrity protection unlike the profile download process illustrated in FIG. 3. The SCP 81 protocol may use a Hypertext Transfer Protocol over Secure Socket Layer (HTTPS) protocol to perform communication between the eUICC Manager 620 and the eUICC 640 and, to this end, the terminal 630 and the eUICC 640 may use a Bearer Independent Protocol (BIP).

At this time, for Transport Layer Security (TLS) authentication used by the SCP81 protocol, unidirectional authentication or mutual authentication using a certificate may be used. Through configuration of Cipher_suite used in TLS authentication, transferred data information may be protected through the SCP81 protocol as follows.

Mutual authentication operation is performed. Integrity protection operation is not performed. Encryption operation is not performed.

Mutual authentication operation is performed. Integrity protect operation is performed. Encryption operation is not performed.

Mutual authentication operation is performed. Integrity protect operation is not performed. Encryption operation is performed.

Mutual authentication operation is performed. Integrity protect operation is performed. Encryption operation is performed.

After the SCP81 session is created, scenario #3 based on the certificate may be performed to generate the SCP03 key set between the Profile Provider 610 and the eUICC 640. At this time, an authentication message transmitted/received between the Profile Provider 610 and the eUICC 640 may be transferred by the eUICC Manager 620 through the SCP81.

After the SCP03 key set between the Profile Provider 610 and the eUICC 640 is generated, SCP03 mutual authentication may be performed and the SCP03 session key set may be generated between the Profile Provider 610 and the eUICC 640. Thereafter, the Profile Provider 610 may transfer profile information encrypted by the SCP03 session key set to the eUICC Manager 620 in the TLV form. The eUICC Manager 620 may transfer the profile information in the TLV form to the eUICC 640 through the SCP81 protocol.

Meanwhile, although not separately illustrated in FIG. 6, the generation of the SCP03 key set and the generation of the APDU and the session key for SP03 mutual authentication may be performed through the exchange of an end-to-end (hereinafter referred to as "end to end") message between the Profile Provider 610 and the eUICC 640. However, the Profile Provider 610 may generate an APDU message based on the certificate of the eUICC 640 in advance and may transmit the generated APDU message to the eUICC Manager 620, then the eUICC Manager 620 may directly transfer the APDU message to the eUICC 640 the SCP81 protocol.

Meanwhile, although FIG. 6 illustrates another example of the profile download process in the wireless communication system according to an embodiment of the present disclosure, various modifications can be made in FIG. 6. For example, although successive steps are illustrated in FIG. 6, the steps illustrated in FIG. 6 may overlap with each other, may be performed in parallel, may be performed in a different order, or may be performed several times.

Figure 7A:
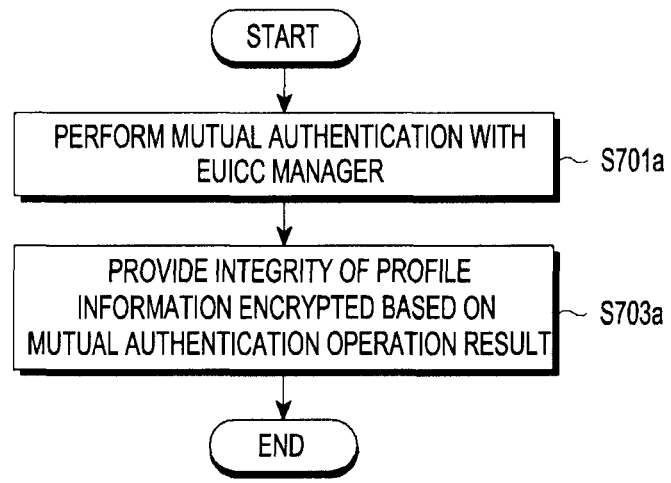
FIGS. 7A and 7B are flowcharts illustrating a profile download method in the wireless communication system according to various embodiments of the present disclosure.
Figure 7B:
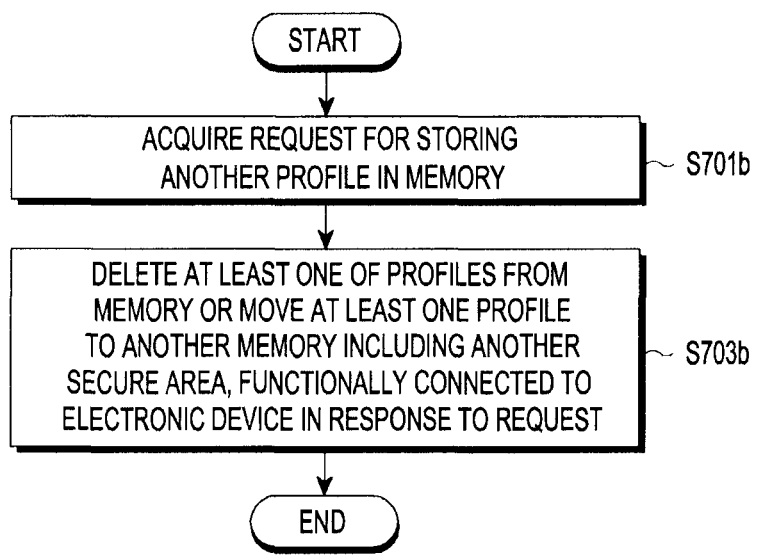

FIGS. 7A and 7B are flowcharts illustrating a profile download method in the wireless communication system according to various embodiments of the present disclosure.

As illustrated in FIG. 7A, according to various embodiments, a profile download device (for example, the terminal 130) with the wireless communication system may perform a mutual authentication operation with an embedded universal integrated circuit card manager (for example, the eUICC manager 120) in operation S701*a*.

According to various embodiments, in operation S703*a*, the profile download device 130 may provide integrity for profile information encrypted based on the result of the performed mutual authentication operation.

As illustrated in FIG. 7B, according to various embodiments, the profile download device 130 may receive a request for storing another profile in the memory in operation S701*b*.

According to various embodiments, in operation S703*b*, the profile download device 130 may delete at least one of the profiles from the memory or move at least one profile to another memory including another secure area operationally connected to the electronic device in response to the request.

Hereinafter, an electronic device according to various embodiments will be described with reference to FIGS. 8 to 10.

In this specification, the electronic device described with reference to FIGS. 8 to 10 may include at least the same elements as those of the profile download the device (for example, the terminal 130) described with reference to FIGS. 1 to 7, and the term "electronic device" may be interchangeably used with the "profile download device" or the "terminal".

Figure 8:
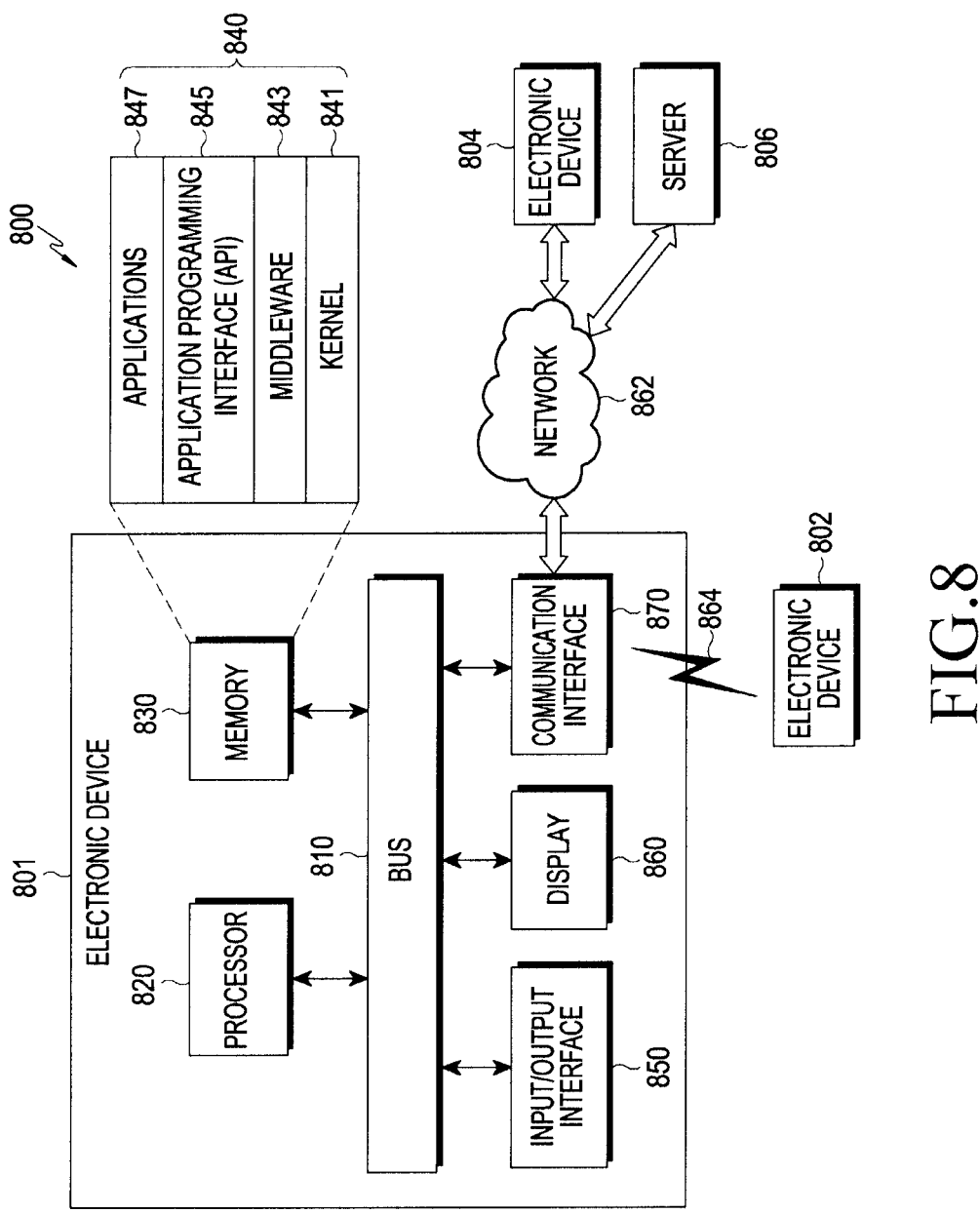
FIG. 8 illustrates a network environment including an electronic device according to an embodiment of the present disclosure.

FIG. 8 illustrates a network environment including an electronic device according to an embodiment of the present disclosure.

Referring to FIG. 8, an electronic device 801 within a network environment 800, according to various embodiments, will be described. The electronic device 801 may include a bus 810, a processor 820, a memory 830, an input/output interface 850, a display 860, and a communication module 870. In some embodiments, the electronic device 801 may omit at least one of the elements, or may further include other elements.

The bus 810 may include, for example, a circuit which interconnects the elements 810 to 870 and delivers communication (for example, a control message and/or data) between the elements 810 to 870.

The processor 820 may include one or more of a Central Processing Unit (CPU), an Application Processor (AP), and a Communication Processor (CP). The processor 820, for example, may carry out operations or data processing relating to the control and/or communication of at least one other element of the electronic device 801.

The memory 830 may include volatile and/or non-volatile memory. The memory 830 may store, for example, instructions or data relevant to at least one other element of the electronic device 801. According to an embodiment, the memory 830 may store software and/or a program 840. For example, the program 840 may include a kernel 841, a middleware 843, an Application Programming Interface (API) 845, and/or application programs (or applications) 847. At least one or more of the kernel 841, the middleware 843, and the API 845 may be referred to as an Operating System (OS).

The kernel 841 may control or manage system resources (for example, the bus 810, the processor 820, or the memory 830) used for executing an operation or function implemented by other programs (for example, the middleware 843, the API 845, or the application 847). Furthermore, the kernel 841 may provide an interface through which the middleware 843, the API 845, or the application programs 847 may access the individual elements of the electronic device 801 in order to control or manage the system resources.

The middleware 843 may function as, for example, an intermediary for allowing the API 845 or the application programs 847 to communicate with the kernel 841 in order to exchange data.

Furthermore, the middleware 843 may process one or more task requests, which are received from the application programs 847, according to priorities thereof. For example, the middleware 843 may assign priorities for using the system resources (for example, the bus 810, the processor 820, the memory 830, or the like) of the electronic device 801 to one or more of the application programs 847. For example, the middleware 843 may perform a scheduling or loading balance on the one or more task requests by processing the one or more task requests according to the priorities assigned to the one or more application programs.

The API 845, which is an interface through which the applications 847 control functions provided from the kernel 841 or the middleware 843, may include, for example, at least one interface or function (for example, instruction) for file control, window control, image processing, text control, or the like.

The input/output interface 850 may function as, for example, an interface that can forward instructions or data, which are input by a user or an external device, to the other element(s) of the electronic device 801. Furthermore, the input/output interface 850 may output the instructions or data received from the other component element(s) of the electronic device 801 to the user or another external device.

The display 860 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 860 may display, for example, various types of content (for example, text, images, videos, icons, symbols, and the like) for a user. The display 860 may include a touch screen and may receive, for example, a touch, gesture, proximity, or hovering input using an electronic pen or the user's body part.

The communication interface 870 may configure communication, for example, between the electronic device 801 and an external device (for example, a first external electronic device 802, a second external electronic device 804, or a server 806). For example, the communication circuit 870 may be connected to a network 862 through wireless or wired communication in order to communicate with the external device (for example, the second external electronic device 804 or the server 806).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 864. The short range communication 864 may include at least one of, for example, Wi-Fi, Bluetooth, Near Field Communication (NFC), Global Navigation Satellite System (GNSS), and the like. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 862 may include at least one of a communication network such as a computer network (for example, a LAN or a WAN), the Internet, and a telephone network.

Both the first and second external electronic devices 802 and 804 may be of the same or a different type from the electronic device 801. According to an embodiment, the server 106A may include a group of one or more servers. According to various embodiments of the present disclosure, all or some of the operations performed by the electronic device 801 may be performed by another electronic device or multiple electronic devices (for example, the first and second external electronic devices 802 and 804 or the server 806). According to an embodiment, when the electronic device 801 has to perform some functions or services automatically or in response to a request, the electronic device 801 may make a request to perform at least some functions relating thereto to another device (for example, the electronic device 802 or 104 or the server 806) instead of performing the functions or services by itself or in addition. Another electronic device (for example, the electronic device 802 or 104 or the server 806) may execute the requested functions or the additional functions, and may deliver a result of the execution to the electronic device 801. The electronic device 801 may provide the received result as it is, or may additionally process the received result to provide the requested functions or services. To this end, for example, cloud computing, distributed computing, or client-server computing technology may be used.

Figure 9:
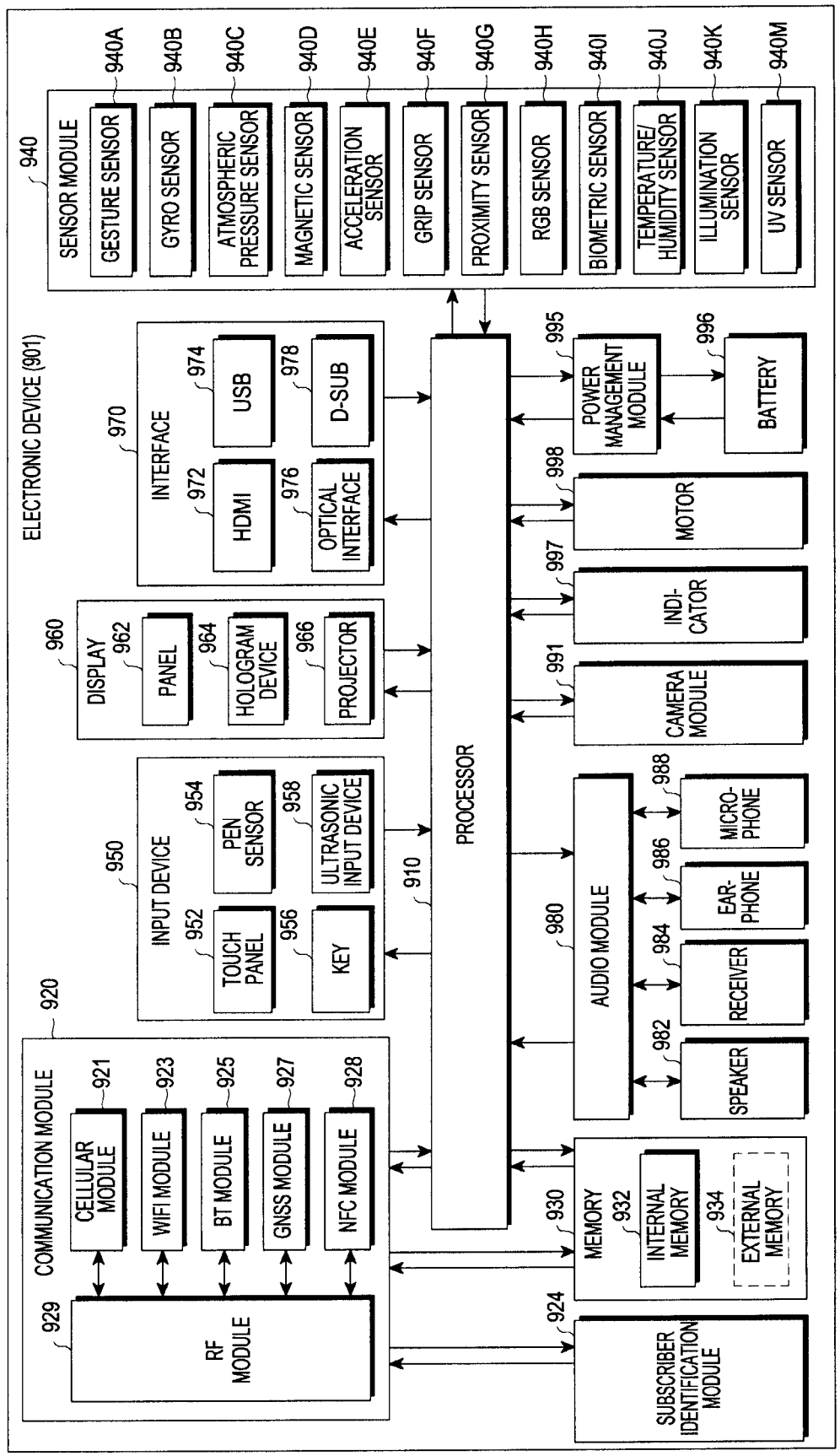
FIG. 9 is a block diagram of an electronic device 901 according to various embodiments.

FIG. 9 is a block diagram of an electronic device 901 according to various embodiments.

The electronic device 901 may include, for example, the whole or part of the electronic device 801 illustrated in FIG. 8. The electronic device 901 may include at least one Application Processor (AP) 910, a communication module 920, a subscriber identification module 924, memory 930, a sensor module 940, an input device 950, a display 960, an interface 970, an audio module 980, a camera module 991, a power management module 995, a battery 996, an indicator 997, and a motor 998.

The processor 910 may control a plurality of hardware or software elements connected thereto and may perform data processing and various operations by driving an operating system or an application program. The processor 910 may be implemented by, for example, a System on Chip (SoC). According to an embodiment, the processor 910 may further include a Graphic Processing Unit (GPU) and/or an image signal processor. The processor 910 may also include at least some of the elements illustrated in FIG. 9 (for example, a cellular module 921). The processor 910 may load, in the volatile memory, instructions or data received from at least one of the other elements (for example, the non-volatile memory) to process the loaded instructions or data, and may store various types of data in the non-volatile memory.

The communication module 920 may have a configuration equal or similar to that of the communication module 870 of FIG. 8. The communication module 920 may include, for example, a cellular module 921, a Wi-Fi module 923, a BT module 925, a GNSS module 927 (for example, a GPS module, a Glonass module, a Beidou module, or a Galileo module), an NFC module 928, and a Radio Frequency (RF) module 929.

The cellular module 921 may provide, for example, a voice call, a video call, a text message service, an Internet service, or the like through a communication network. According to an embodiment, the cellular module 921 may identify and authenticate the electronic device 901 within a communication network using the subscriber identification module 924 (for example, a SIM card). According to an embodiment, the cellular module 921 may perform at least some of the functions that the processor 910 may provide. According to an embodiment, the cellular module 921 may include a Communication Processor (CP).

The Wi-Fi module 923, the BT module 925, the GNSS module 927, and the NFC module 928 may include, for example, a processor for processing data transmitted and received through the relevant module. According to some embodiments, at least some (for example, two or more) of the cellular module 921, the Wi-Fi module 923, the BT module 925, the GNSS module 927, and the NFC module 928 may be included in one Integrated Chip (IC) or IC package.

The RF module 929 may transmit/receive, for example, a communication signal (for example, an RF signal). The RF module 929 may include, for example, a transceiver, a Power Amplifier Module (PAM), a frequency filter, a Low Noise Amplifier (LNA), an antenna, and the like. According to another embodiment, at least one of the cellular module 921, the Wi-Fi module 923, the BT module 925, the GPS module 927, and the NFC module 928 may transmit/receive an RF signal through a separate RF module.

The subscriber identification module 924 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 930 (for example, the memory 830) may include, for example, internal memory 932 or external memory 934. The internal memory 932 may include, for example, at least one volatile memory (for example, a Dynamic Random Access Memory (DRAM), a Static RAM (SRAM), a Synchronous Dynamic RAM (SDRAM), and the like) and non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, flash memory (for example, a NAND flash memory or a NOR flash memory), a hard disc drive, a Solid State Drive (SSD), and the like.

The external memory 934 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 934 may be operationally and/or physically connected to the electronic device 901 through various interfaces.

The sensor module 940 may, for example, measure a physical quantity or detect the operating state of the electronic device 901 and may convert the measured or detected information into an electrical signal. The sensor module 940 may include, for example, at least one of a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (for example, a red, green, blue (RGB) sensor), a biometric sensor 940I, a temperature/humidity sensor 940J, an illuminance sensor 940K, and an ultraviolet (UV) sensor 940M. Additionally or alternatively, the sensor module 940 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 940 may further include a control circuit for controlling one or more of the sensors included therein. In some embodiments, the electronic device 901 may further include a processor configured to control the sensor module 940 as a part of or separately from the AP 910, and may control the sensor module 940 while the AP 910 is in a sleep state.

The input device 950 may include, for example, a touch panel 952, a (digital) pen sensor 954, a key 956, or an ultrasonic input unit 958. The touch panel 952 may use, for example, at least one of a capacitive type, a resistive type, an infrared type, and an ultrasonic type. Furthermore, the touch panel 952 may further include a control circuit. The touch panel 952 may further include a tactile layer to provide a tactile reaction to a user.

According to an embodiment, the touch panel 952 may include a pressure sensor (or a "force sensor" interchangeably used hereinafter) for measuring the strength of the pressure from a user's touch. The pressure sensor and the touch panel 952 may be implemented in the integrated form or the pressure sensor may be implemented as one or more sensors separated from the touch panel 952.

The (digital) pen sensor 954 may include, for example, a recognition sheet that is a part of, or separate from, the touch panel. The key 956 may include, for example, a physical button, an optical key, or a keypad. The ultrasonic input device 958 may detect ultrasonic waves, which are generated by an input tool, through a microphone (for example, a microphone 988) to identify data corresponding to the detected ultrasonic waves.

The display 960 (for example, the display 860) may include a panel 962, a hologram device 964 or a projector 966. The panel 962 may have a configuration that is the same as, or similar to, that of the display 860 illustrated in FIG. 8. The panel 962 may be implemented to be, for example, flexible, transparent, or wearable. The panel 962, together with the touch panel 952, may be implemented as one module. The hologram device 964 may show a three dimensional image in the air by using the interference of light. The projector 966 may display an image by projecting light onto a screen. The screen may be located, for example, in the interior of or on the exterior of, the electronic device 901. According to one embodiment, the display 960 may further include a control circuit for controlling the panel 962, the hologram device 964, or the projector 966.

The interface 970 may include, for example, a High-Definition Multimedia Interface (HDMI) 972, a Universal Serial Bus (USB) 974, an optical interface 976, or a D-subminiature (D-sub) 978. The interface 970 may be included, for example, in the communication interface 870 illustrated in FIG. 8. Additionally or alternatively, the interface 970 may include, for example, a Mobile High-definition Link (MHL) interface, a Secure Digital (SD) card/Multi-Media Card (MMC) interface, or an Infrared Data Association (IrDA) standard interface.

The audio module 980 may convert, for example, a sound into an electrical signal, and vice versa. At least some elements of the audio module 980 may be included, for example, in the input/output interface 850 illustrated in FIG. 8. The audio module 980 may process sound information that is input or output through, for example, a speaker 982, a receiver 984, earphones 986, the microphone 988, and the like.

The camera module 991 is a device that can photograph a still image and a dynamic image. According to an embodiment, the camera module 991 may include one or more image sensors (for example, a front sensor or a rear sensor), a lens, an Image Signal Processor (ISP), or a flash (for example, an LED, a xenon lamp, and the like).

The power management module 995 may manage, for example, the power of the electronic device 901. According to an embodiment, the power management module 995 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 996 and a voltage, current, or temperature while charging. The battery 996 may include, for example, a rechargeable battery and/or a solar battery.

The indicator 997 may display a particular state, for example, a booting state, a message state, a charging state, or the like, of the electronic device 901 or a part (for example, the processor 910) of the electronic device 901. The motor 998 may convert an electrical signal into a mechanical vibration and may generate a vibration, a haptic effect, and the like. Although not illustrated, the electronic device 901 may include a processing unit (for example, a GPU) for supporting mobile TV. The processing unit for supporting mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device, according to various embodiments of the present disclosure, may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 10:
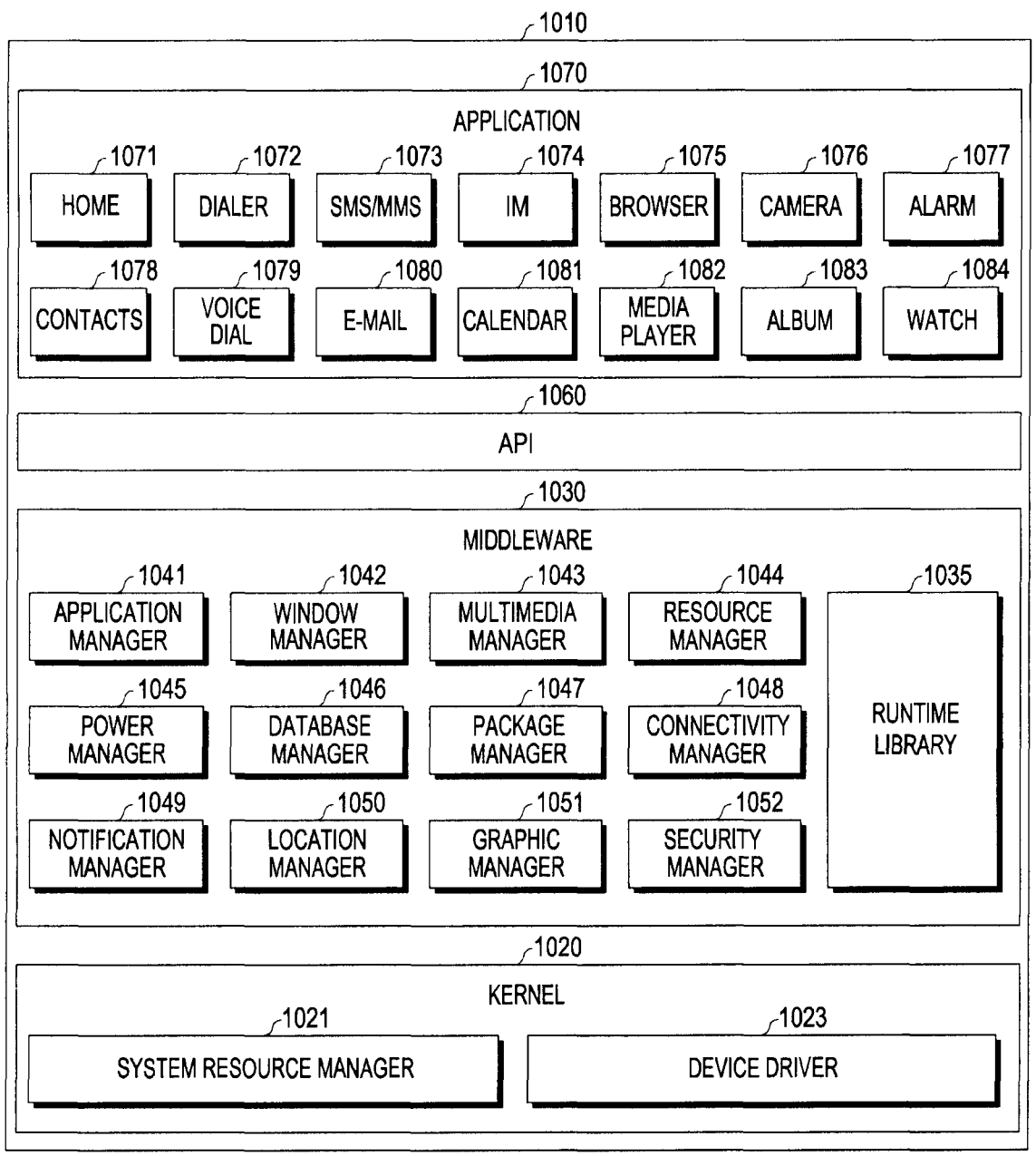
FIG. 10 is a block diagram of a program module according to various embodiments.

FIG. 10 is a block diagram of a program module according to various embodiments.

According to an embodiment, the program module 1010 (for example, the program 840) may include an Operating System (OS) that controls resources relating to an electronic device (for example, the electronic device 801) and/or various applications (for example, the application programs 847) that are executed in the operating system. The operating system may be, for example, Android, iOS, Windows, Symbian, Tizen, Bada, and the like.

The program module 1010 may include a kernel 1020, middleware 1030, an Application Programming Interface (API) 1060, and/or applications 1070. At least a part of the program module 1010 may be preloaded on the electronic device, or may be downloaded from an external electronic device (for example, the electronic device 802 or 104 or the server 806).

The kernel 1020 (for example, the kernel 841) may include, for example, a system resource manager 1021 and/or a device driver 1023. The system resource manager 1021 may control, allocate, or retrieve system resources. According to an embodiment, the system resource manager 1021 may include a process manager, a memory manager, or a file system manager. The device driver 1023 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 1030 may provide a function required by the applications 1070 in common or provide various functions to the applications 1070 through the API 1060 so that the applications 1070 can efficiently use limited system resources within the electronic device. According to an embodiment, the middleware 1030 (for example, the middleware 843) may include, for example, at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035 may include, for example, a library module that a compiler uses in order to add a new function through a programming language while the applications 1070 are being executed. The runtime library 1035 may perform input/output management, memory management, the functionality for an arithmetic function, and the like.

The application manager 1041 may manage, for example, the life cycle of at least one of the applications 1070. The window manager 1042 may manage Graphical User Interface (GUI) resources used on a screen. The multimedia manager 1043 may determine formats required to reproduce various media files and may encode or decode a media file using a coder/decoder (codec) appropriate for the corresponding format. The resource manager 1044 may manage resources, such as the source code, the memory, the storage space, and the like of at least one of the applications 1070.

The power manager 1045 may operate together with, for example, a Basic Input/Output System (BIOS) to manage a battery or power and provide power information required for the operation of the electronic device. The database manager 1046 may generate, search for, and/or change a database to be used by at least one of the applications 1070. The package manager 1047 may manage the installation or update of an application that is distributed in the form of a package file.

The connectivity manager 1048 may manage a wireless connection, such as Wi-Fi, Bluetooth, and the like. The notification manager 1049 may display or notify of an event, such as an arrival message, an appointment, a proximity notification, and the like, in such a manner as not to disturb a user. The location manager 1050 may manage the location information of the electronic device. The graphic manager 1051 may manage a graphic effect to be provided to a user and a user interface relating to the graphic effect. The security manager 1052 may provide various security functions required for system security, user authentication, and the like. According to an embodiment, in a case where the electronic device (for example, the electronic device 801) has a telephone call function, the middleware 1030 may further include a telephony manager for managing a voice or video call function of the electronic device.

The middleware 1030 may include a middleware module that forms a combination of various functions of the above-described elements. The middleware 1030 may provide specialized modules according to the types of operating systems in order to provide differentiated functions. Furthermore, the middleware 1030 may dynamically remove some of the existing elements, or may add new elements.

The API 1060 (for example, the API 845) is, for example, a set of API programming functions, and may be provided with different configurations according to operating system. For example, in the case of Android or iOS, one API set may be provided for each platform, and in the case of Tizen, two or more API sets may be provided for each platform.

The applications 1070 (for example, the application programs 847) may include, for example, one or more applications of home 1071, dialer 1072, SMS/MMS 1073, Instant Message (IM) 1074, browser 1075, camera 1076, alarm 1077, contacts 1078, voice dial 1079, e-mail 1080, calendar 1081, media player 1082, album 1083, clock 1084, or an application of providing health care (for example, measuring exercise quantity or blood sugar) or environmental information (for example, atmospheric pressure, humidity, temperature information, and the like).

According to an embodiment, the applications 1070 may include an application (hereinafter referred to as an "information exchange application" for the convenience of the description) that supports information exchange between the electronic device (for example, the electronic device 801) and an external electronic device (for example, the electronic device 802 or 104). The information exchange application may include, for example, a notification relay application for transferring specific information to an external electronic device or a device management application for managing an external electronic device.

For example, the notification relay application may include a function which delivers notification information generated by other applications (for example, an SMS/MMS application, an email application, a health care application, an environmental information application, and the like) of the electronic device to the external electronic device (for example, the electronic device 802 or 104). Furthermore, the notification relay application may, for example, receive notification information from the external electronic device and may provide the received notification information to a user.

The device management application may manage (for example, install, delete, or update) at least one function of an external electronic device (for example, the electronic device 802 or 104) that communicates with the electronic device (for example, a function for turning on/off the external electronic device itself (or some components thereof) or a function for adjusting the brightness (or resolution) of a display), applications that operate in the external electronic device, or services (for example, a call service, a message service, and the like) that are provided by the external electronic device.

According to an embodiment, the applications 1070 may include applications (for example, a health care application of a mobile medical appliance, and the like) that are specified according to attributes of an external electronic device (for example, the electronic device 802 or 104). According to an embodiment, the applications 1070 may include applications that are received from an external electronic device (for example, the server 806, or the electronic device 802 or 104). According to an embodiment, the applications 1070 may include preloaded applications or third-party applications that can be downloaded from a server. Names of the elements of the program module 1010, according to the above-described embodiments of the present disclosure, may change depending on the type of OS.

According to various embodiments, at least a part of the program module 1010 may be implemented in software, firmware, hardware, or a combination of two or more thereof. At least some of the program module 1010 may be implemented (for example, executed) by, for example, the processor (for example, the processor 910). At least some of the program module 1010 may include, for example, a module, a program, a routine, a set of instructions, and/or a process for performing one or more functions.

Hereinafter, a method of managing a memory by an electronic device according to various embodiments of the present disclosure will be described with reference to FIGS. 11 to 23.

Figure 11:
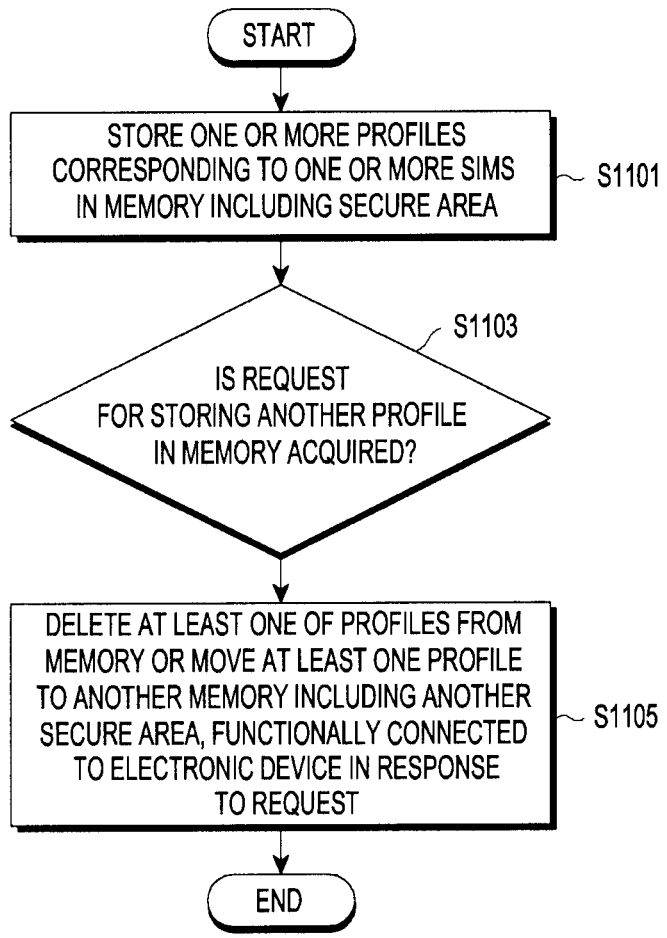
FIG. 11 is a flowchart illustrating a method of managing the memory by the electronic device according to various embodiments of the present disclosure.

FIG. 11 is a flowchart illustrating the method of managing the memory by the electronic device according to various embodiments of the present disclosure.

As illustrated in FIG. 11, according to various embodiments, the electronic device (for example, the electronic device 801) may store one or more profiles corresponding to one or more subscriber identification modules in the memory, including a secure area in operation S1101.

According to various embodiments, the electronic device 801 may determine whether or not a request for storing another profile in the memory is acquired in operation S1103.

According to various embodiments, in operation S1105, the electronic device 801 may delete at least one of the profiles from the memory or move at least one profile to another memory including another secure area operationally connected to the electronic device based on the result of the determination of whether or not the request for storing the other profile in the memory has been acquired.

According to various embodiments, the electronic device 801 may move at least one profile to another memory and then store another profile in the electronic device 801.

Figure 12:
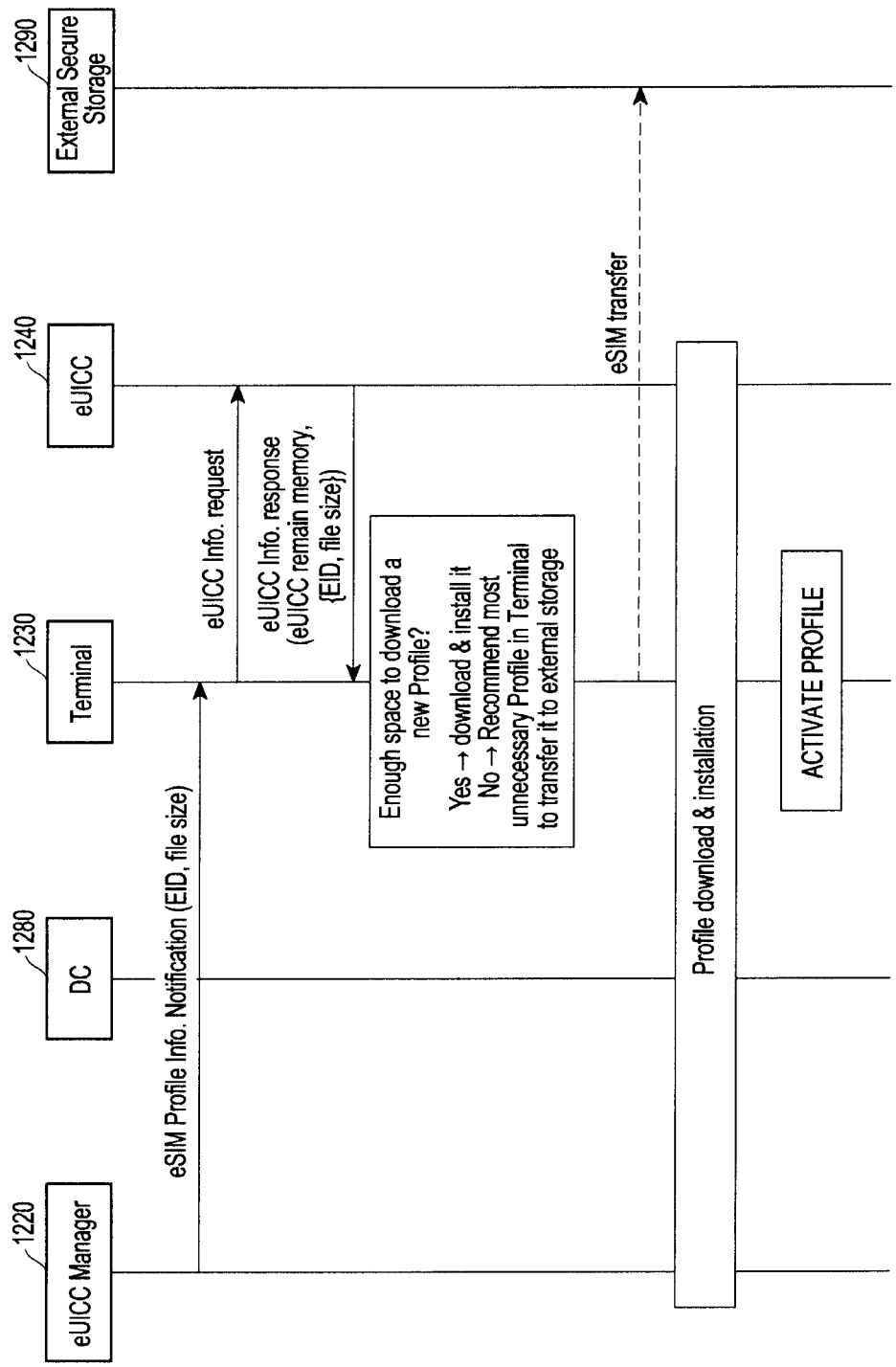
FIG. 12 illustrates a method of managing the memory by the electronic device (terminal) in the wireless communication system according to various embodiments of the present disclosure.

FIG. 12 illustrates a method of managing the memory by the electronic device (terminal) in the wireless communication system according to various embodiments of the present disclosure.

As illustrated in FIG. 12, the wireless communication system according to various embodiments of the present disclosure may include an eUICC Manager 1220, a DC 1280, a terminal 1230, an eUICC 1240, and an external secure storage 1290.

The eUICC Manager 1220 may transmit (notify) profile information (eSIM profile Info.) (for example, an EID or file size) of the eSIM to the terminal 1230.

The terminal 1230 may transmit a request for eUICC information to the eUICC 1240 and receive the eUICC information (for example, a remaining capacity of the eUICC or file size) from the eUICC 1240 in response to the request.

The terminal 1230 may determine whether or not there is enough space in the memory for storing a new profile.

When there is enough space in the memory, the terminal 1230 may download and install the corresponding profile.

When there is not enough space in the memory, the terminal 1230 may delete a profile within the terminal 1230 or recommend the most unnecessary profile to the user in order to move it to the external secure storage 1290. The terminal 1230 may delete the selected eSIM profile from the pre-stored profiles or transmit it to the external secure storage 1290 according to the recommendation result. Thereafter, the terminal 1230 may download and install a new profile, select one or more of the profiles stored in the memory, and activate the selected profiles.

Figure 13A:
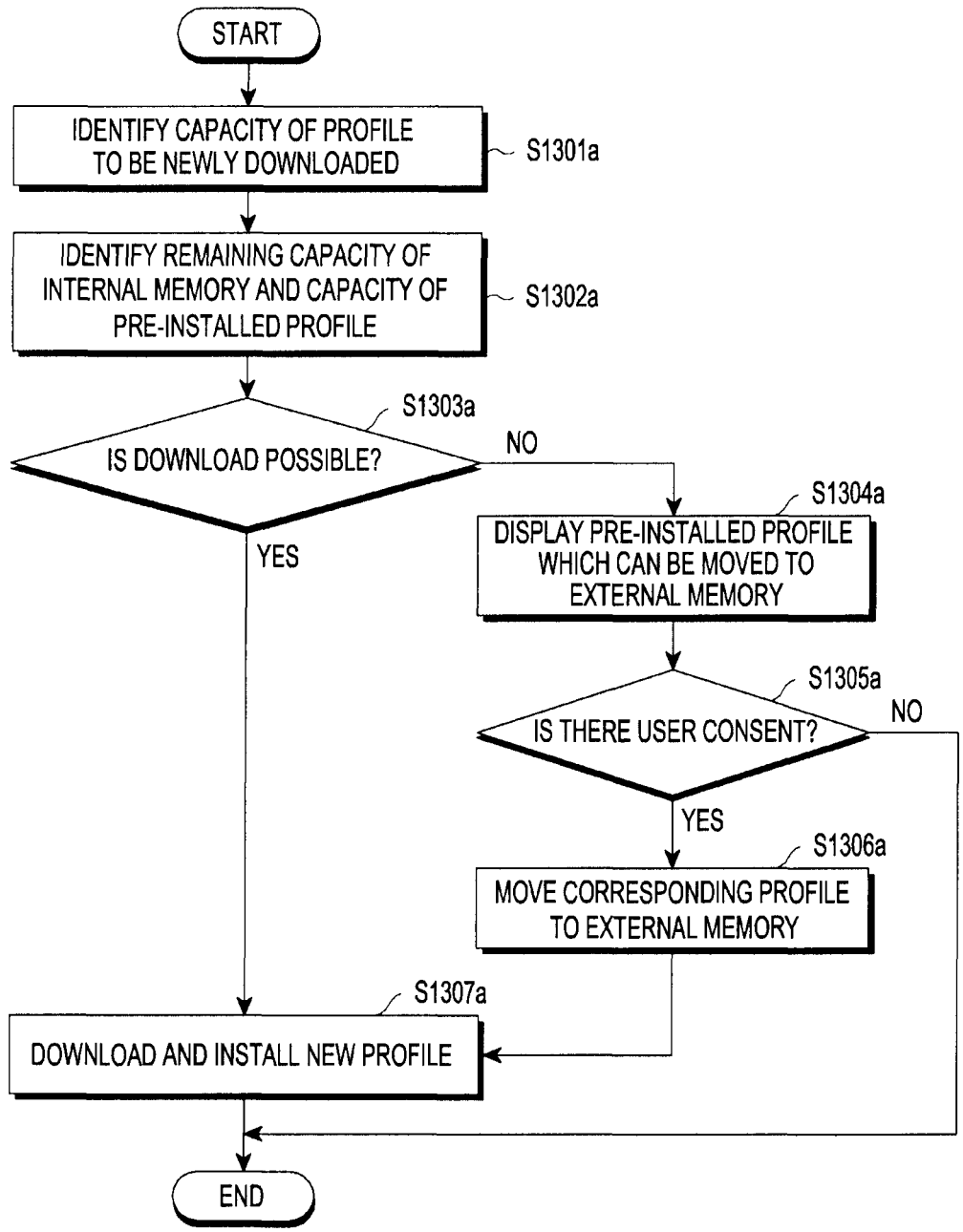
FIG. 13A is a flowchart illustrating the method of managing the memory by the electronic device according to various embodiments of the present disclosure.

When there is not enough space in the memory, the terminal 1230 may close the download session and then recommend an unnecessary profile to the user during the above process. Further, when the terminal 1230 deletes the unnecessary profile or moves the unnecessary profile to the external secure storage 1290, thus securing memory space, the terminal 1230 may start the profile download process again. FIG. 13A is a flowchart illustrating the method of managing the memory by the electronic device according to various embodiments of the present disclosure.

As illustrated in FIG. 13A, according to various embodiments, the electronic device (for example, the electronic device 801) may identify the capacity of a profile to be newly downloaded in operation S1301a.

According to various embodiments, in operation S1302a, the electronic device 1301 may identify a remaining capacity of the internal memory and the capacity of the pre-installed profile in operation S1302a.

According to various embodiments, the electronic device 1301 may determine whether or not the new profile can be downloaded based on the identification result in operation S1303a.

According to various embodiments, when it is determined that the download is not possible, the electronic device 1301 may display pre-installed profiles, which can be moved to the external memory, through a display in operation S1304a.

According to various embodiments, the electronic device 1301 may determine whether or not user consent is received through the display in operation S1305a.

According to various embodiments, when user consent is received, the electronic device 1301 may move the corresponding profile to the external memory in operation S1306a.

According to various embodiments, when it is determined that the download is possible, the electronic device 1301 may download the new profile and install the downloaded profile in operation S1307a.

Figure 13B:
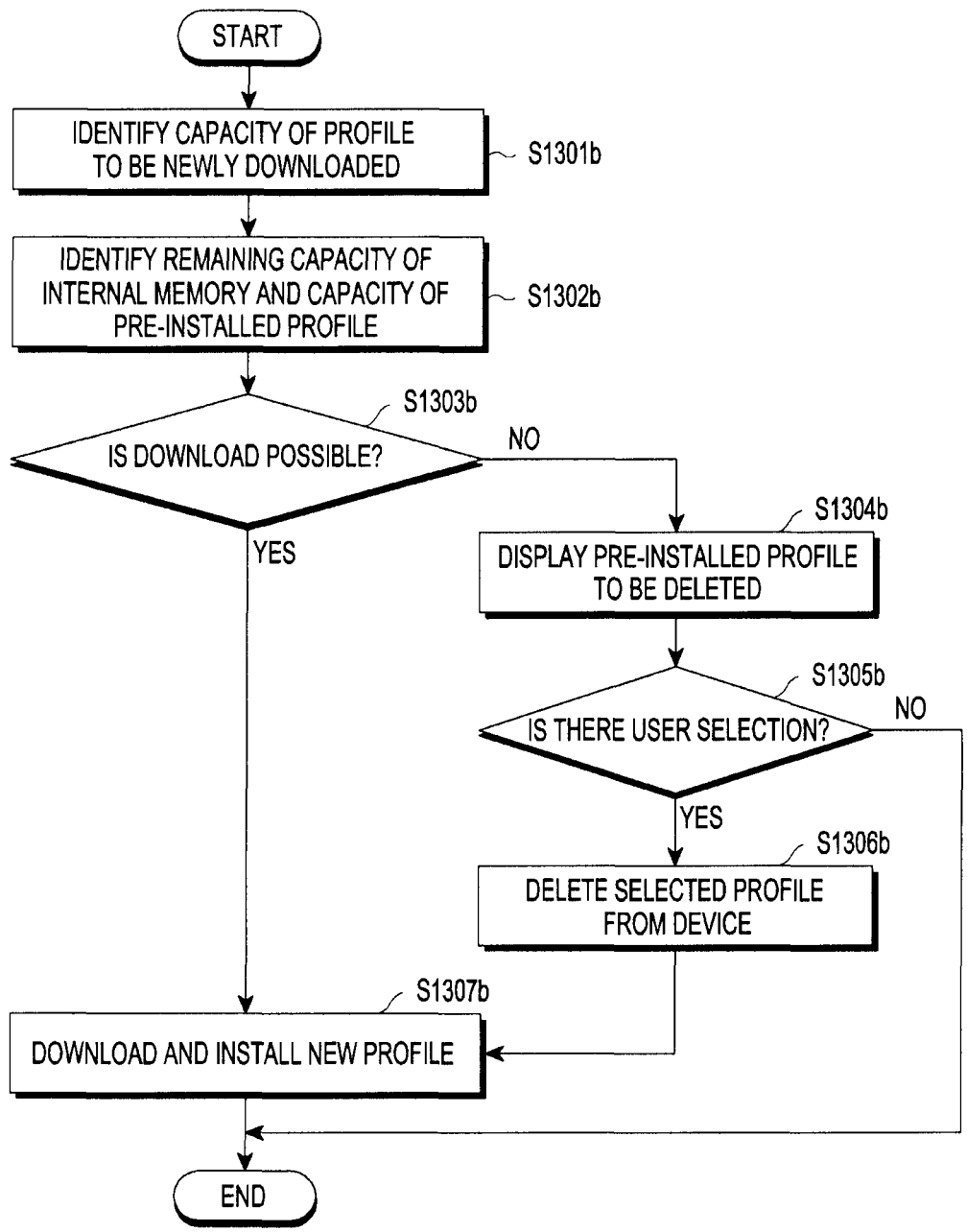
FIG. 13B is a flowchart illustrating the method of managing the memory by the electronic device according to various embodiments of the present disclosure.

FIG. 13B is a flowchart illustrating the method of managing the memory by the electronic device according to various embodiments of the present disclosure.

As illustrated in FIG. 13B, according to various embodiments, the electronic device (for example, the electronic device 801) may identify the capacity of a profile to be newly downloaded in operation S1301b.

According to various embodiments, the electronic device 1301 may identify the remaining capacity of the internal memory and the capacity of the pre-installed profile in operation S1302b.

According to various embodiments, the electronic device 1301 may determine whether or not the new profile can be downloaded based on the identification result in operation S1303b.

According to various embodiments, when it is determined that the download is not possible, the electronic device 1301 may display the pre-installed profiles, which can be deleted, through a display in operation S1304b.

According to various embodiments, the electronic device 1301 may determine whether or not user selection is received through the display in operation S1305b.

According to various embodiments, when the user selection is received, the electronic device 1301 may delete the corresponding profile in operation S1306b.

According to various embodiments, when it is determined that the download is possible, the electronic device 1301 may download the new profile and install the downloaded profile in operation S1307b.

Figure 14:
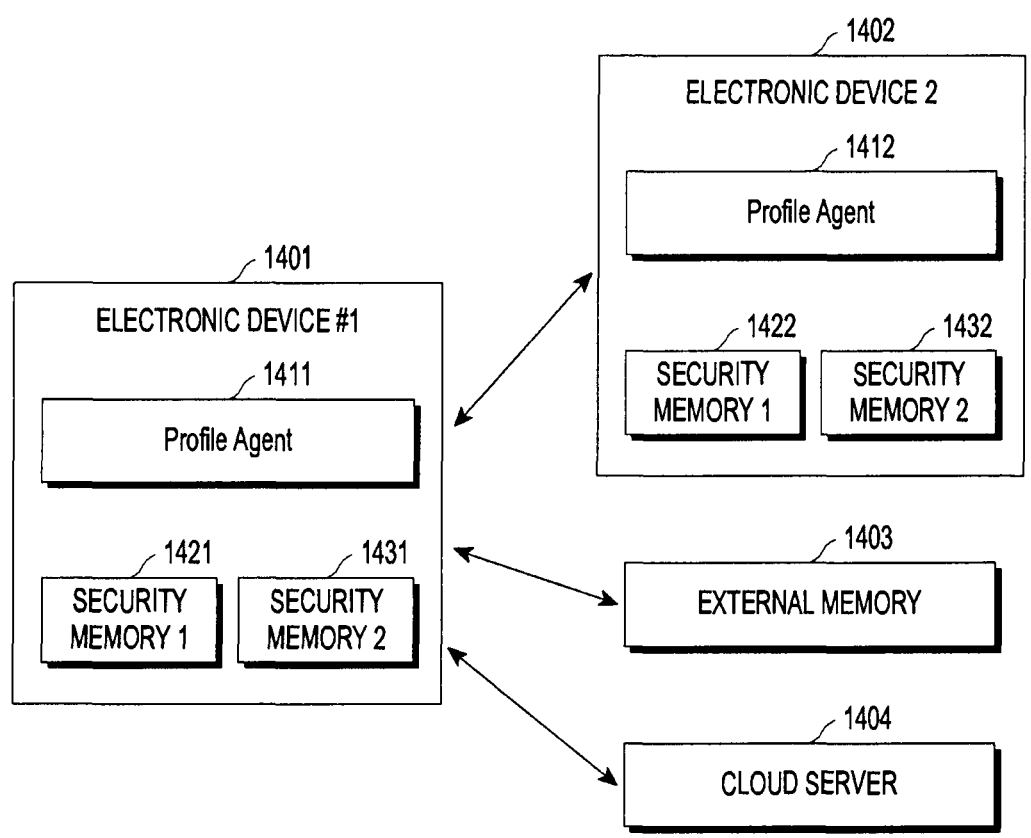
FIG. 14 illustrates the electronic device (terminal) according to various embodiments of the present disclosure.

FIG. 14 illustrates the electronic device (terminal) according to various embodiments of the present disclosure.

As illustrated in FIG. 14, according to various embodiments, electronic device #1 1401 may include at least one of a profile agent 1411, secure memory #1 1421, and secure memory #2 1431. According to various embodiments, electronic device #2 1402 may include at least one of a profile agent 1412, secure memory #1 1422, and secure memory #2 1432.

According to various embodiments, electronic device #1 1401 may be electrically connected and/or may be connected through communication with external memory 1403 and a cloud server 1404 outside electronic device #1 1401.

According to various embodiments, the profile agent 1411 may perform an identification operation of the capacities of, storing, and deleting one or more profiles stored in electronic device #1 1401.

According to various embodiments, secure memory #1 1421 or secure memory #2 1431 may store one or more profiles.

According to various embodiments, the profile agent 1411 may have the same meaning as the processor (for example, the processor 820).

According to various embodiments, secure memory #1 1421 or secure memory #2 1431 may have the same meaning as the memory (for example, the memory 830).

According to various embodiments, the profile agent 1411 may be configured to provide, through the display (for example, the display 860), a User Interface (UI) for selecting at least one of the profiles stored in secure memory #1 1421 or secure memory #2 1431 in response to the download request.

According to various embodiments, when there is a current lack of storage space in secure memory #1 1421 of electronic device #1 1401, and thus a new profile cannot be downloaded, the Profile Agent 1411 may move the pre-installed profile to secure memory #2 1431 of electronic device #1 1401, to secure memory #1 1422 or secure memory #2 1432 of electronic device #2 1402 (which is an external electronic device of electronic device #1 1401), to the external memory 1403, or to the cloud server 1404 in order to encrypt the new profile and download the encrypted profile to secure memory #1 1421.

Figure 15:
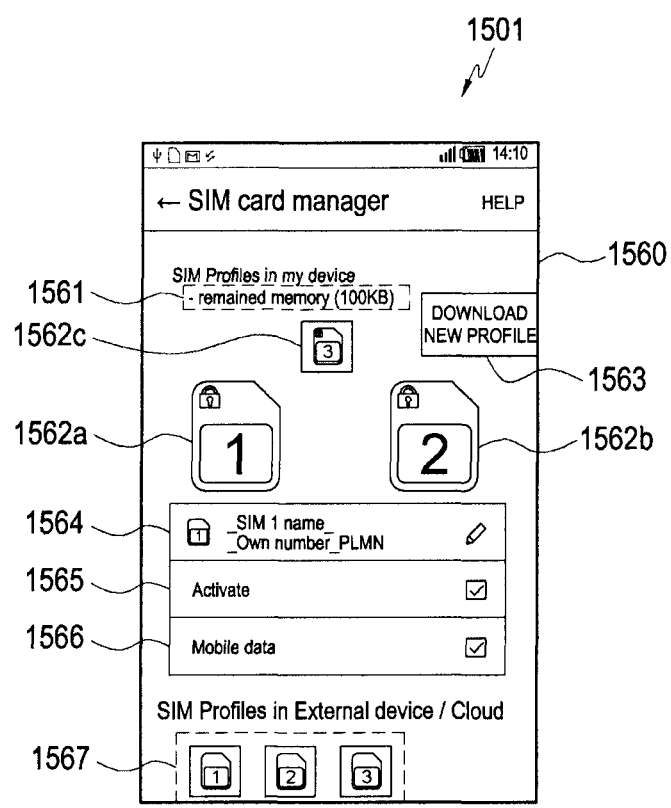
FIG. 15 illustrates a screen displaying a pre-stored profile list according to an embodiment of the present disclosure.

FIG. 15 illustrates a screen displaying a pre-stored profile list according to an embodiment of the present disclosure.

As illustrated in FIG. 15, according to an embodiment, the display 1560 of an electronic device 1501 may display one or more profiles pre-stored in the secure area of the memory 830 included in the electronic device 1501 under a control of the processor (for example, the processor 820) of the electronic device 1501.

According to an embodiment, the display 1560 may display remaining capacity information 1561, including information on the remaining capacity of the memory 830 that stores one or more profiles corresponding to subscriber identification modules. For example, the remaining capacity information 1561 may include information on the remaining capacity of the memory 830 in the unit of bytes (B), kilobytes (KB), megabytes (MB), or gigabytes (GB). For example, although not illustrated in FIG. 15, the remaining capacity information 1561 may include not only the remaining capacity of the memory 830, but also information on the number of profiles which can be additionally stored in the memory 830.

According to an embodiment, the display 1560 may display one or more profile items 1562a, 1562b, and 1562c. For example, the one or more profiles 1562a, 1562b, and 1562c may be displayed in a circular, rectangular, or pentagonal-shaped UICC chip. For example, among the one or more profile items, the first profile item 1562a and the second profile item 1562b, which are used in the electronic device 1501, may be displayed larger than the third profile item 1562c, which is not used in the electronic device 1501. For example, among the one or more profile items, the first profile item 1562a and the second profile item 1562b, which are used in the electronic device 1501, may be displayed in a color different from that of the third profile item 1562c, which is not used in the electronic device 1501.

According to an embodiment, the display 1560 may display identification information 1564 of a first profile among the one or more profiles. For example, first profile identification information 1564 may include name information of a subscriber identification module ("_SIM 1 name_ Own number_PLMN") corresponding to the first profile.

According to an embodiment, the display 1560 may display information 1565 on whether to activate the first profile. For example, the information 1565 on whether to activate the first profile may include "Activate" indicating "activation" and a check box indicating whether the first profile is activated.

According to an embodiment, the display 1560 may display information 1566 on whether to use mobile data for the first profile. For example, the information 1566 on whether to use mobile data for the first profile may include "Mobile Data" indicating "mobile data" and a check box indicating whether mobile is used by the first profile.

According to an embodiment, the display 1560 may display a profile list 1567 including profile items of one or more profiles stored in the memory 830 included in the electronic device 1501 and the external memory (for example, the external secure storage 1290) of the electronic device 1501. For example, the display 1560 may display first profiles stored in the memory 830 inside the electronic device in a different color from that of second profiles stored in the memory 1290 outside the electronic device. For example, the display 1560 may display first profiles stored in the memory 830 inside the electronic device in a size different from that of second profiles stored in the memory 1290 outside the electronic device. For example, the display 1560 may display first profiles stored in the memory 830 inside the electronic device larger than second profiles stored in the memory 1290 outside the electronic device. For example, the display 1560 may display first profiles stored in the memory 830 inside the electronic device in a shape different from that of second profiles stored in the memory 1290 outside the electronic device. For example, the display 1560 may display first profiles stored in the memory 830 inside the electronic device in a UICC chip shape and second profiles stored in the memory 1290 outside the electronic device in a rectangular shape.

According to an embodiment, the display 1560 may display a new profile download tab 1563 for receiving a request to download a profile different from one or more pre-stored profiles.

Figure 16:
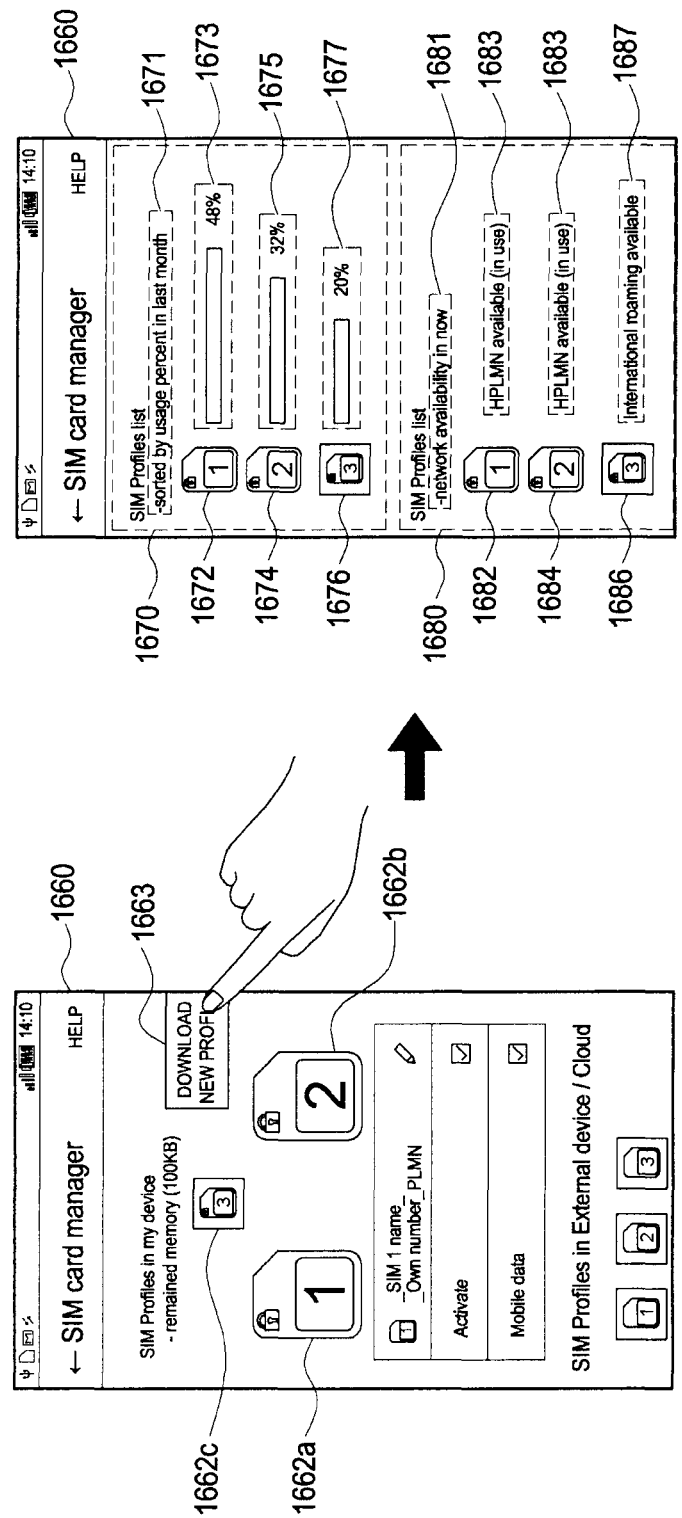
FIG. 16 illustrates a screen in which a profile to be deleted is recommended in response to a download request according to an embodiment of the present disclosure.

FIG. 16 illustrates a screen in which a profile to be deleted is recommended in response to a download request according to an embodiment of the present disclosure.

As illustrated in FIG. 16, according to an embodiment, when user input (for example, touch input) is received on a new profile download tab 1663 displayed through a display 1660, the processor 820 of the electronic device 801 may determine whether or not the remaining capacity for storing at least one of the additional profiles 1662a, 1662b, and 1662c pre-stored in the memory (for example, the memory 830) of the electronic device 801 and a new profile is sufficient.

According to an embodiment, when it is determined that the remaining capacity is not enough, the display 1660 of the electronic device 801 may display one or more recommendation screens 1670 and 1680 in order to move at least one profile including profile items 1672, 1674, 1676, 1682, 1684, and 1686 corresponding to pre-stored one or more profiles 1662a, 1662b, and 1662c arranged according to a preset priority to an external electronic device (for example, electronic device #2 1402, the external memory 1403 or the cloud server 1404) or deleting the same.

According to an embodiment, the priority may be a ranking of the usage pattern of the user with respect to one or more profiles. For example, the first priority 1671 may include information on a preset first priority for arranging one or more profile items corresponding to one or more pre-stored profiles.

According to an embodiment, among the one or more recommendation screens, a first recommendation screen 1670 may include a first profile item 1672 corresponding to a first profile among one or more pre-stored profiles and first profile information 1673 corresponding to the first priority of the first profile. According to an embodiment, among the one or more recommendation screens, the first recommendation screen 1670 may include a second profile item 1674 corresponding to a second profile among one or more pre-stored profiles and second profile information 1675 corresponding to the first priority of the second profile. According to an embodiment, among the one or more recommendation screens, the first recommendation screen 1670 may include a third profile item 1676 corresponding to a third profile among one or more pre-stored profiles and third profile information 1677 corresponding to the first priority of the third profile.

According to an embodiment, among the one or more recommendation screens, a second recommendation screen 1680 may display a second priority 1681 that is a priority which recommends that a profile be moved or deleted. For example, the second priority 1681 may include information on a preset second priority for arranging one or more profile items corresponding to one or more pre-stored profiles.

According to an embodiment, among one or more recommendation screens, the second recommendation screen 1680 may include a first profile item 1682 corresponding to the first profile among one or more pre-stored profiles and first profile information 1683 corresponding to the second priority of the first profile. According to an embodiment, among one or more recommendation screens, the second recommendation screen 1680 may include a second profile item 1684 corresponding to the second profile among one or more pre-stored profiles and second profile information 1685 corresponding to the second priority of the second profile. According to an embodiment, among one or more recommendation screens, the second recommendation screen 1680 may include a third profile item 1686 corresponding to the third profile among one or more pre-stored profiles and third profile information 1687 corresponding to the second priority of the third profile.

Figure 17:
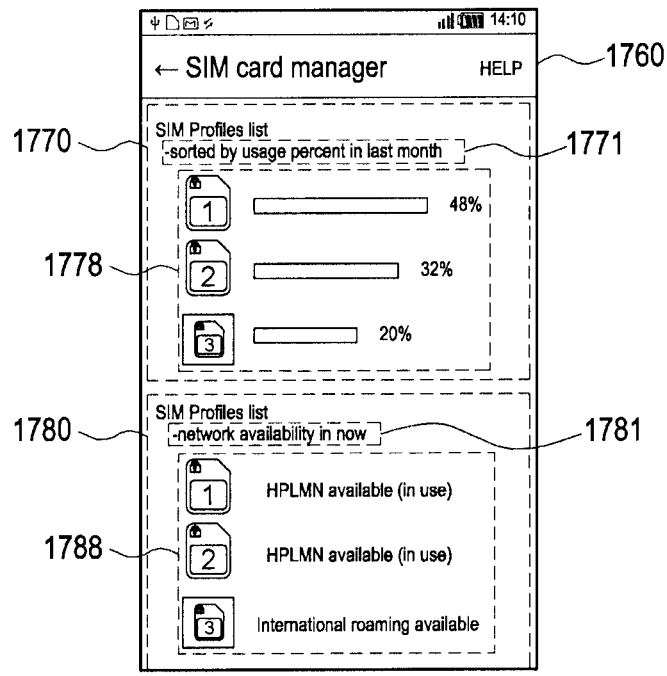
FIG. 17 illustrates a screen in which a profile is recommended according to an embodiment of the present disclosure.

FIG. 17 illustrates a screen in which a profile is recommended according to an embodiment of the present disclosure.

As illustrated in FIG. 17, according to various embodiments, a display 1760 may display a first recommendation screen 1770 in which moving or deleting at least one profile 1778 is recommended based on the first priority 1771 and a second recommendation screen 1780 in which moving or deleting at least one profile 1788 is recommended based on the second priority 1781 under a control of the processor (for example, the processor 820).

For example, the first priority 1771 may include information on the preset first priority ("sorted by usage percent in last month") for arranging one or more profile items corresponding to one or more pre-stored profiles.

For example, among one or more recommendation screens, the first recommendation screen 1770 may include the first priority 1771, a first profile item corresponding to a first profile among one or more pre-stored profiles, and first profile information ("48%") corresponding to the first priority ("sorted by usage percent in last month") of the first profile. For example, among one or more recommendation screens, the first recommendation screen 1770 may include a second profile item corresponding to a second profile among one or more pre-stored profiles and second profile information ("32%") corresponding to the first priority ("sorted by usage percent in last month") of the second profile. For example, among one or more recommendation screens, the first recommendation screen 1770 may include a third profile item corresponding to a third profile among one or more pre-stored profiles and third profile information ("20%") corresponding to the first priority ("sorted by usage percent in last month") of the third profile.

For example, the second priority 1781 may include information on the preset second priority ("network available in now") for arranging one or more profile items corresponding to one or more pre-stored profiles.

For example, among one or more recommendation screens, the second recommendation screen 1780 may include a first profile item corresponding to a first profile among one or more pre-stored profiles and first profile information ("HPLMN available (in use)") corresponding to the second priority ("network available in now") of the first profile. For example, among one or more recommendation screens, the second recommendation screen 1780 may include a second profile item corresponding to a second profile among one or more pre-stored profiles and second profile information ("HPLMN available (in use)") corresponding to the second priority ("network available in now") of the second profile. For example, among one or more recommendation screens, the second recommendation screen 1780 may include a third profile item corresponding to a third profile among one or more pre-stored profiles and third profile information ("International roaming available") corresponding to the second priority ("network available in now") of the third profile.

Figure 18:
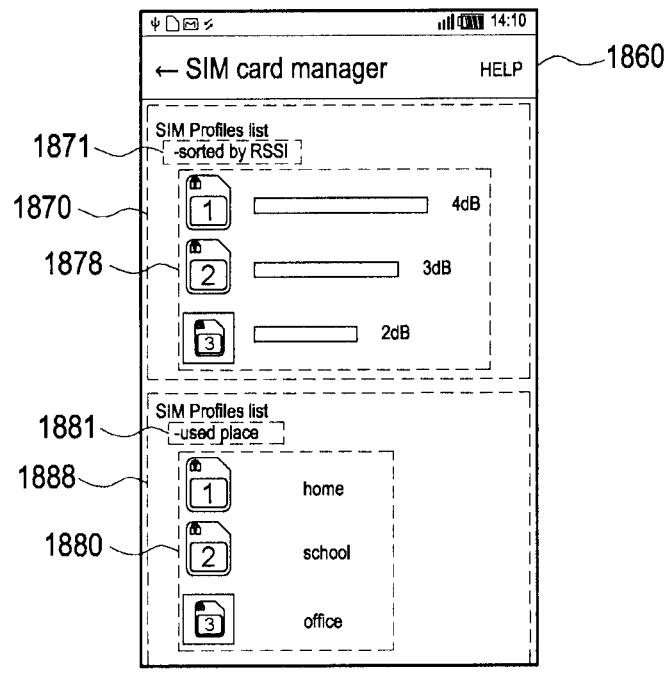
FIG. 18 illustrates a screen in which a profile is recommended according to an embodiment of the present disclosure.

FIG. 18 illustrates a screen in which a profile is recommended according to an embodiment of the present disclosure.

As illustrated in FIG. 18, according to various embodiments, a display 1860 may display a first recommendation screen 1870 in which moving or deleting at least one profile 1878 is recommended based on the first priority 1871 and a second recommendation screen 1880 in which moving or deleting at least one profile 1888 is recommended based on the second priority 1881 under the control of the processor (for example, the processor 820).

For example, the first priority 1871 may include information on the preset first priority ("sorted by an RSSI") for arranging one or more profile items corresponding to one or more pre-stored profiles.

For example, among one or more recommendation screens, the first recommendation screen 1870 may include a first profile item corresponding to a first profile among one or more pre-stored profiles and first profile information ("4 dB") corresponding to the first priority ("sorted by an RSSI") of the first profile. For example, among one or more recommendation screens, the first recommendation screen 1870 may include a second profile item corresponding to a second profile among one or more pre-stored profiles and second profile information ("3 dB") corresponding to the first priority ("sorted by an RSSI") of the second profile. For example, among one or more recommendation screens, the first recommendation screen 1870 may include a third profile item corresponding to a third profile among one or more pre-stored profiles and third profile information ("2 dB") corresponding to the first priority ("sorted by an RSSI") of the third profile.

For example, a second priority 1881 may include information on the preset second priority ("sorted by used place") for arranging one or more profile items corresponding to one or more pre-stored profiles.

For example, among one or more recommendation screens, the second recommendation screen 1880 may include a first profile item corresponding to a first profile among one or more pre-stored profiles and first profile information ("home") corresponding to the second priority ("network available in now") of the first profile. For example, among one or more recommendation screens, the second recommendation screen 1880 may include a second profile item corresponding to a second profile among one or more pre-stored profiles and second profile information ("school") corresponding to the second priority ("network available in now") of the second profile. For example, among one or more recommendation screens, the second recommendation screen 1880 may include a third profile item corresponding to a third profile among one or more pre-stored profiles and third profile information ("office") corresponding to the second priority ("network available in now") of the third profile.

Figure 19:
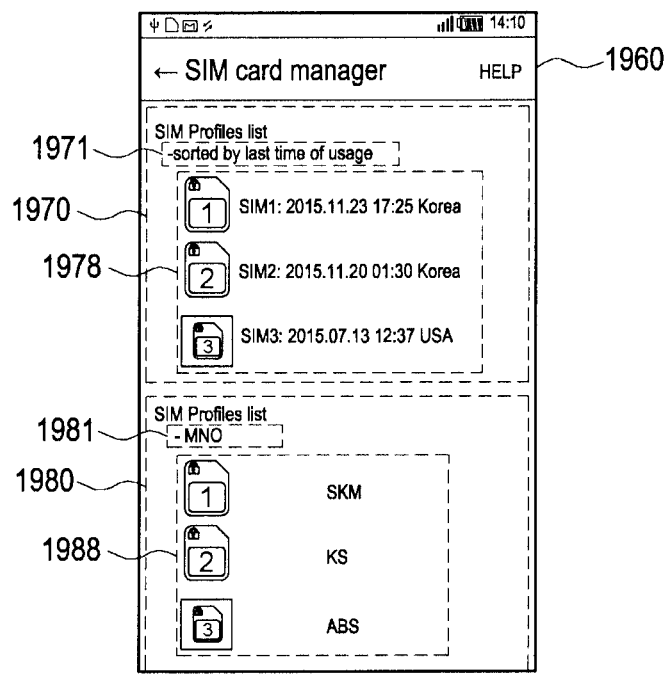
FIG. 19 illustrates a screen in which a profile is recommended according to an embodiment of the present disclosure.

FIG. 19 illustrates a screen in which a profile is recommended according to an embodiment of the present disclosure.

As illustrated in FIG. 19, according to various embodiments, a display 1960 may display a first recommendation screen 1970 in which moving or deleting at least one profile 1978 is recommended based on the first priority 1971 and a second recommendation screen 1980 in which moving or deleting at least one profile 1988 is recommended based on the second priority 1981 under the control of the processor (for example, the processor 920).

For example, the first priority 1971 may include information on a preset first priority ("sorted by last time of usage") for arranging one or more profile items corresponding to one or more pre-stored profiles.

For example, among one or more recommendation screens, the first recommendation screen 1970 may include a first profile item corresponding to a first profile among one or more pre-stored profiles and first profile information ("17:00") corresponding to the first priority ("sorted by last time of usage") of the first profile. For example, among one or more recommendation screens, the first recommendation screen 1970 may include a second profile item corresponding to a second profile among one or more pre-stored profiles and second profile information ("16:00") corresponding to the first priority ("sorted by last time of usage") of the second profile. For example, among one or more recommendation screens, the first recommendation screen 1970 may include a third profile item corresponding to a third profile among one or more pre-stored profiles and third profile information ("15:00") corresponding to the first priority ("sorted by last time of usage") of the third profile.

For example, a second priority 1981 may include information on a preset second priority ("MNO") for arranging one or more profile items corresponding to one or more pre-stored profiles.

For example, among one or more recommendation screens, the second recommendation screen 1980 may include a first profile item corresponding to a first profile among one or more pre-stored profiles and first profile information ("SKM") corresponding to the second priority ("MNO") of the first profile. For example, among one or more recommendation screens, the second recommendation screen 1980 may include a second profile item corresponding to a second profile among one or more pre-stored profiles and second profile information ("KS") corresponding to the second priority ("MNO") of the second profile. For example, among one or more recommendation screens, the second recommendation screen 1980 may include a third profile item corresponding to a third profile among one or more pre-stored profiles and third profile information ("ABS") corresponding to the second priority ("MNO") of the third profile.

Figure 20:
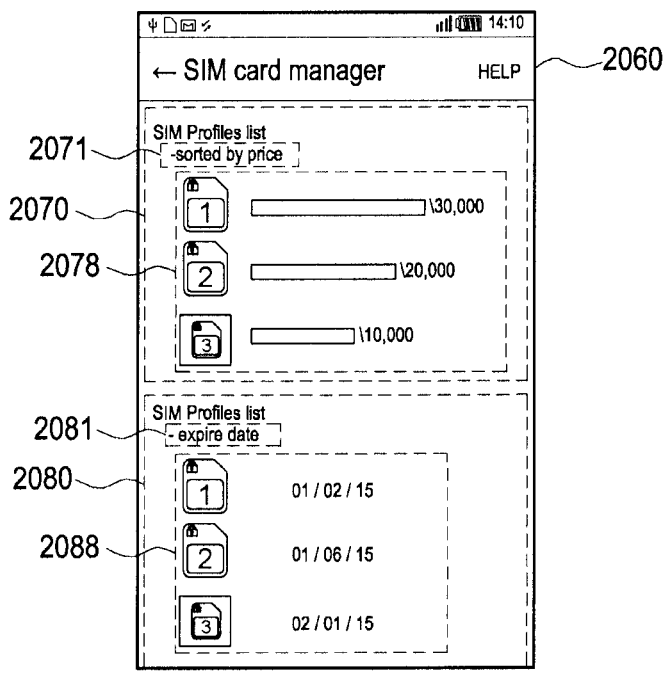
FIG. 20 illustrates a screen in which a profile is recommended according to an embodiment of the present disclosure.

FIG. 20 illustrates a screen in which a profile is recommended according to an embodiment of the present disclosure.

As illustrated in FIG. 20, for example, a first priority 2071 may include information on a preset first priority ("sorted by price") for arranging one or more profile items corresponding to one or more pre-stored profiles.

For example, among one or more recommendation screens, a first recommendation screen 2070 may include a first profile item corresponding to a first profile among one or more pre-stored profiles and first profile information ("\4000") corresponding to the first priority ("sorted by price") of the first profile. For example, among one or more recommendation screens, the first recommendation screen 2070 may include a second profile item corresponding to a second profile among one or more pre-stored profiles and second profile information ("\3000") corresponding to the first priority ("sorted by price") of the second profile. For example, among one or more recommendation screens, the first recommendation screen 2070 may include a third profile item corresponding to a third profile among one or more pre-stored profiles and third profile information ("\2000") corresponding to the first priority ("sorted by price") of the third profile.

For example, a second priority 2081 may include information on a preset second priority ("expire date") for arranging one or more profile items corresponding one or more pre-stored profiles.

For example, among one or more recommendation screens, a second recommendation screen 2080 may include a first profile item corresponding to a first profile among one or more pre-stored profiles and first profile information ("01/02/15") corresponding to the second priority ("expire date") of the first profile. For example, according to an embodiment, among one or more recommendation screens, the second recommendation screen 2080 may include a second profile item corresponding to a second profile among one or more pre-stored profiles and second profile information ("01/06/15") corresponding to the second priority ("expire date") of the second profile. For example, among one or more recommendation screens, the second recommendation screen 2080 may include a third profile item corresponding to a third profile among one or more pre-stored profiles and third profile information ("02/01/15") corresponding to the second priority ("expire date") of the third profile.

Figure 21:
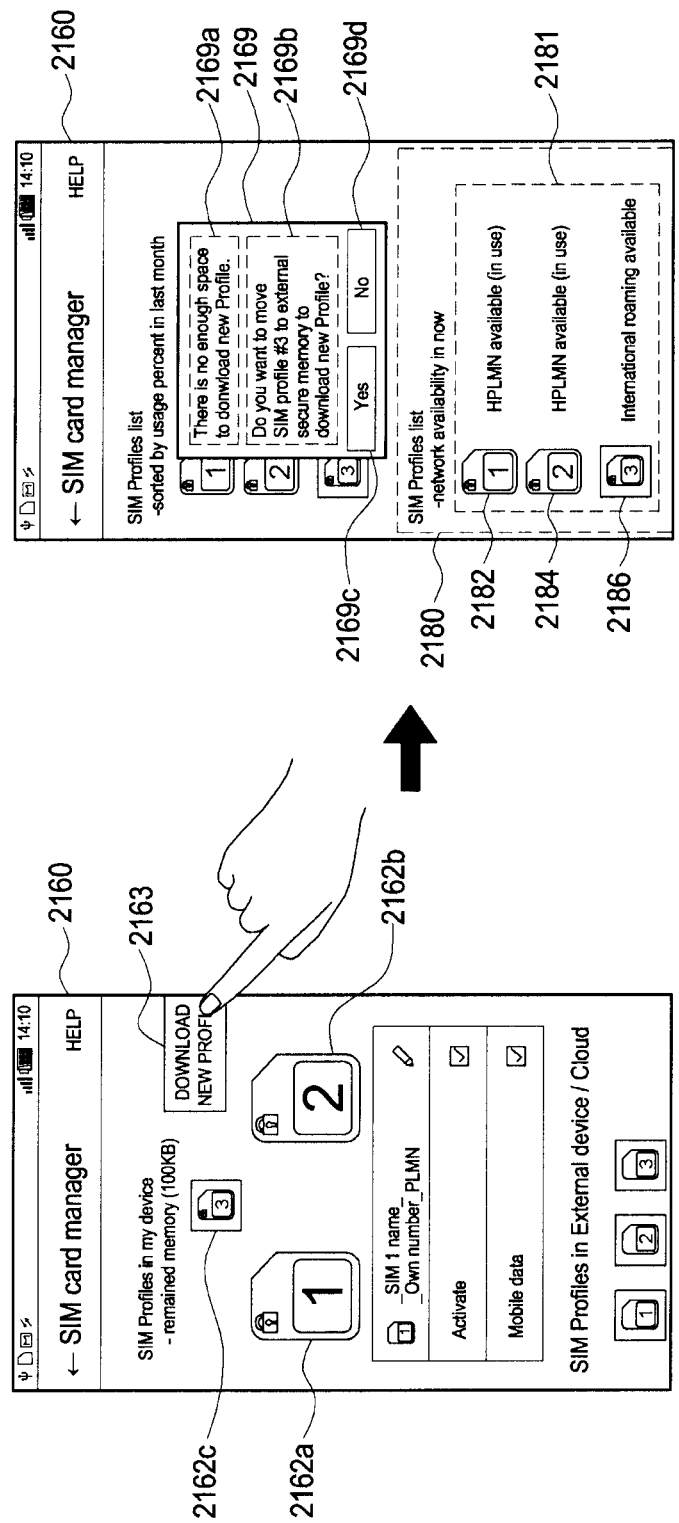
FIG. 21 illustrates a profile movement menu according to an embodiment of the present disclosure.

FIG. 21 illustrates a profile movement menu according to an embodiment of the present disclosure.

As illustrated in FIG. 21, according to an embodiment, a display 2160 of the electronic device (for example, the electronic device 801) may receive input for a new file download tab 2163.

According to an embodiment, the processor (for example, the processor 820) may determine whether or not a remaining capacity for storing at least one of the one or more profiles pre-stored in the memory (for example, 830) of the electronic device 801 and a new profile is enough, in response to receiving the input for the new profile download tab 2163.

According to an embodiment, when it is determined that the remaining capacity is not enough, the processor 820 may select at least one profile (for example, a third profile) to be moved from the memory 830 to an external electronic device (for example, electronic device #2 1402, the external memory 1403, or the cloud server 1404) among the one or more pre-stored profiles according to a preset priority.

According to an embodiment, when at least one profile is selected, the display 2160 of the electronic device 801 may display a profile movement menu 2169 for moving at least one of the one or more pre-stored profiles outside under the control of the processor 820.

For example, the profile movement menu 2169 may include information ("There is no enough space to download new profile") 2169a indicating that there is not enough capacity remaining to store another profile in the memory 830.

For example, the profile movement menu 2169 may include an item ("Do you want to move SIM profile #3 to an external secure memory to download new Profile?") 2169b that inquires about whether or not to move at least one profile (third profile "#3") selected from among the one or more pre-stored profiles according to the preset priority.

For example, the profile movement menu 2169 may include a first tab ("Yes") 2169c for selecting the movement of the selected profile (third profile "#3") and a second tab ("No") 2169d for selecting no movement thereof.

According to an embodiment, when it is determined that the remaining capacity is not enough, the display 2160 of the electronic device 801 may display a recommendation screen 2180 including profile items 2182, 2184, and 2186 corresponding to one or more pre-stored profiles under the control of the processor 820.

Figure 22:
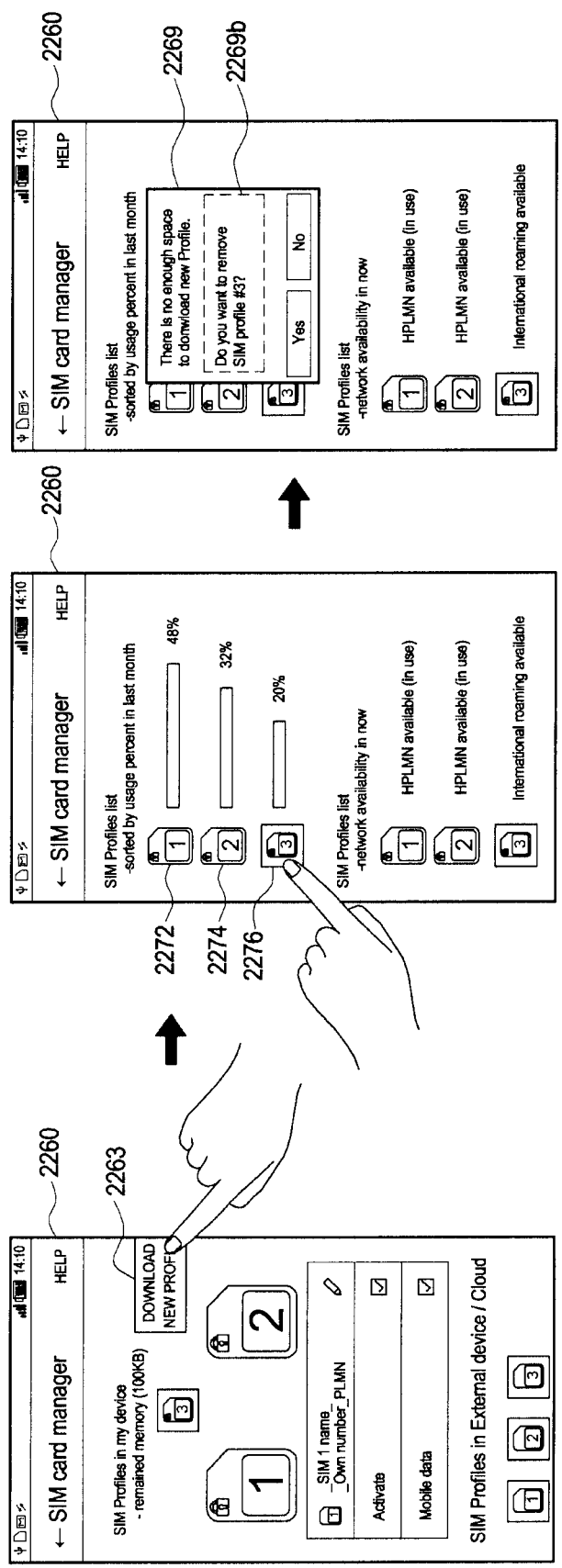
FIG. 22 illustrates a profile deletion screen according to an embodiment of the present disclosure.

FIG. 22 illustrates a profile deletion screen according to an embodiment of the present disclosure.

As illustrated in FIG. 22, according to an embodiment, a display 2260 of the electronic device (for example, the electronic device 801) may receive input for a new file download tab 2263.

According to an embodiment, the processor (for example, the processor 820) may determine whether or not the remaining capacity for storing at least one of the one or more profiles pre-stored in the memory (for example, 830) of the electronic device 801 and a new profile is enough, in response to receiving the input for the new profile download tab 2263.

According to an embodiment, when it is determined that the remaining capacity is not enough, the display 2260 of the electronic device 801 may display profile items 2272, 2274, and 2276 corresponding to one or more pre-stored profiles arranged according to a preset priority under the control of the processor 820.

According to an embodiment, when input for at least one profile item 2276 among profile items 2272, 2274, and 2276, corresponding to one or more pre-stored profiles arranged according to a preset priority, is received in a state in which the profile items 2272, 2274, and 2276, corresponding to the one or more pre-stored profiles arranged according to the preset priority, are displayed, the display 2260 may display a profile deletion menu 2269 for deleting at least one profile (third profile) selected among from the one or more pre-stored profiles under a control of the processor 820.

Figure 23:
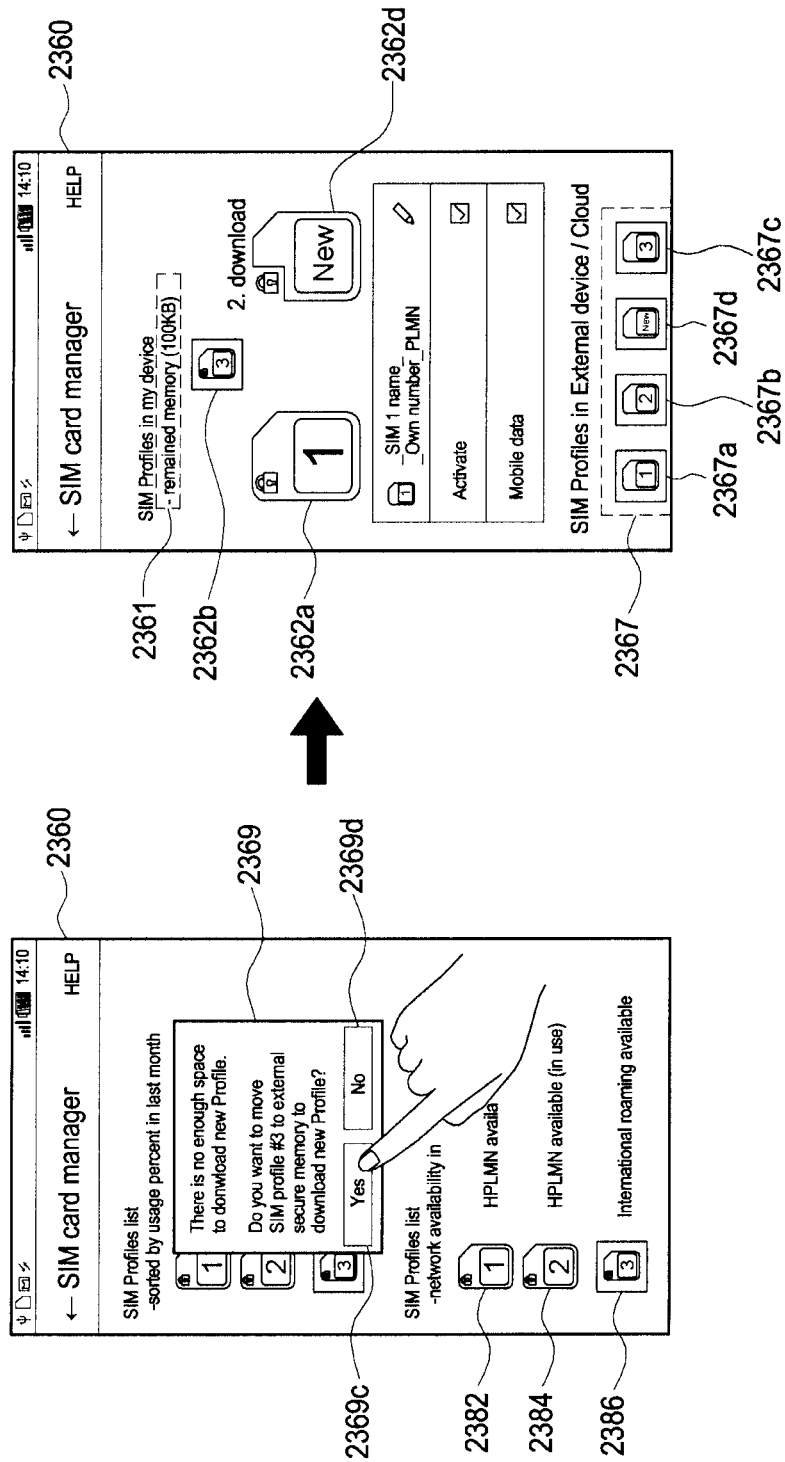
FIG. 23 illustrates a screen in which a newly installed profile list is displayed in response to a profile movement request according to an embodiment of the present disclosure.

FIG. 23 illustrates a screen in which a newly installed profile list is displayed in response to a profile movement request according to an embodiment of the present disclosure.

As illustrated in FIG. 23, according to an embodiment, when user input is received on a first tab 2379c for moving at least one selected profile (the third profile) in a state in which a profile movement menu 2369, for moving at least one profile (the third profile) selected from one or more pre-stored profiles, is displayed, the display 2360 may display a profile list screen including the profile item 2362d of another profile newly stored in the memory 830 of the electronic device 801 and one or more profile items 2362a and 2362b of the remaining one or more profiles (the first profile and the second profile) except for at least one moved profile (third profile) among one or more profiles (the first profile, the second profile, and the third profile) pre-stored in the memory 830 of the electronic device 801 under the control of the processor 820.

For example, the display 2360 may display the profile item 2362d of a fourth profile ("New") newly stored in the memory 830 among the one or more profile items 2362a, 2362b, and 2362d to be distinguished from the profile items 2362a and 2362b of the remaining one or more profiles (the first profile and the second profile).

For example, the display 2360 may display the profile item 2362d of the fourth profile ("New") newly stored in the memory 830 among the one or more profile items 2362a, 2362b, and 2362d larger than the profile items 2362a and 2362b of the remaining one or more profiles (the first profile and the second profile).

For example, the display 2360 may display the profile item 2362d of the fourth profile ("New") newly stored in the memory 830 among the one or more profile items 2362a, 2362b, and 2362d in a color different from that of the profile items 2362a and 2362b of the remaining one or more profiles (the first profile and the second profile).

For example, the display 2360 may display the profile item 2362d of the fourth profile ("New") newly stored in the memory 830 among the one or more profile items 2362a, 2362b, and 2362d in a shape different from that of the profile items 2362a and 2362b of the remaining one or more profiles (the first profile and the second profile).

For example, unlike the profile items 2362a and 2362b of the remaining one or more profiles (the first profile and the second profile), the display 2360 may display information ("download") indicating a newly stored profile above the profile item 2362d of the fourth profile ("New") newly stored in the memory 830 among the one or more profile items 2362a, 2362b, and 2362d.

For example, unlike the profile items 2362a and 2362b of the remaining one or more profiles (the first profile and the second profile), the display 2360 may display information ("New") indicating a new profile in the profile item 2362d of the fourth profile ("New") newly stored in the memory 830 among the one or more profile items 2362a, 2362b, and 2362d.

According to an embodiment, when user input is received on the first tab 2369c for moving at least one selected profile (the third profile) during the state in which the profile movement menu 2369 for moving at least one profile (the third profile) selected from one or more pre-stored profiles is displayed, the processor (for example, the processor 820) may move at least one selected profile (the third profile) from the memory 830 within the electronic device 801 to an external memory (for example the external memory 1290) and delete at least one selected profile (the third profile) from the memory 830 within the electronic device 801. According to various embodiments, after moving at least one selected profile (the third profile), the processor 820 may store another acquired profile that has been requested to be stored within the memory 830 and the display 2360 may display a profile item area 2367 of profiles stored in the memory 830 within the electronic device 801 and an external memory (for example, the external memory 1290) outside the electronic device 801 under the control of the processor 820.

According to an embodiment, when user input is received on a first tab 2379c for moving at least one selected profile (the third profile) during the state in which the profile movement menu 2369 for moving at least one profile (the third profile) selected from one or more pre-stored profiles is displayed, the display 2360 may display a profile item 2367d of another profile newly stored in the memory 830 within the electronic device 801, one or more profile items 2362a and 2362b of the remaining one or more profiles (the first profile and the second profile) with the exception of at least one moved profile (the third profile) among the one or more profiles (the first profile, the second profile, and the third profile) pre-stored in the memory 830 within the electronic device 801, and a profile item 2367c of at least one profile (the third profile) currently moved to and stored in an external memory (for example, the external memory 1290).

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memory including random access memory and flash memory, Read Only Memory (ROM), Electrically Erasable Programmable Read Only Memory (EEPROM), a magnetic disc storage device, a Compact Disc-ROM (CD-ROM), Digital Versatile Discs (DVDs), other types of optical storage devices, or a magnetic cassette. Alternatively, any combination of some or all of these may form the memory in which the program is stored. Further, a plurality of such memory may be included in the electronic device.

In addition, the programs may be stored in an attachable storage device which may access the electronic device through communication networks such as the Internet, Intranet, Local Area Network (LAN), Wide LAN (WLAN), Storage Area Network (SAN), or a combination thereof. Such a storage device may access the electronic device via an external port. Further, a separate storage device on the communication network may access a portable electronic device.

Figure 24:
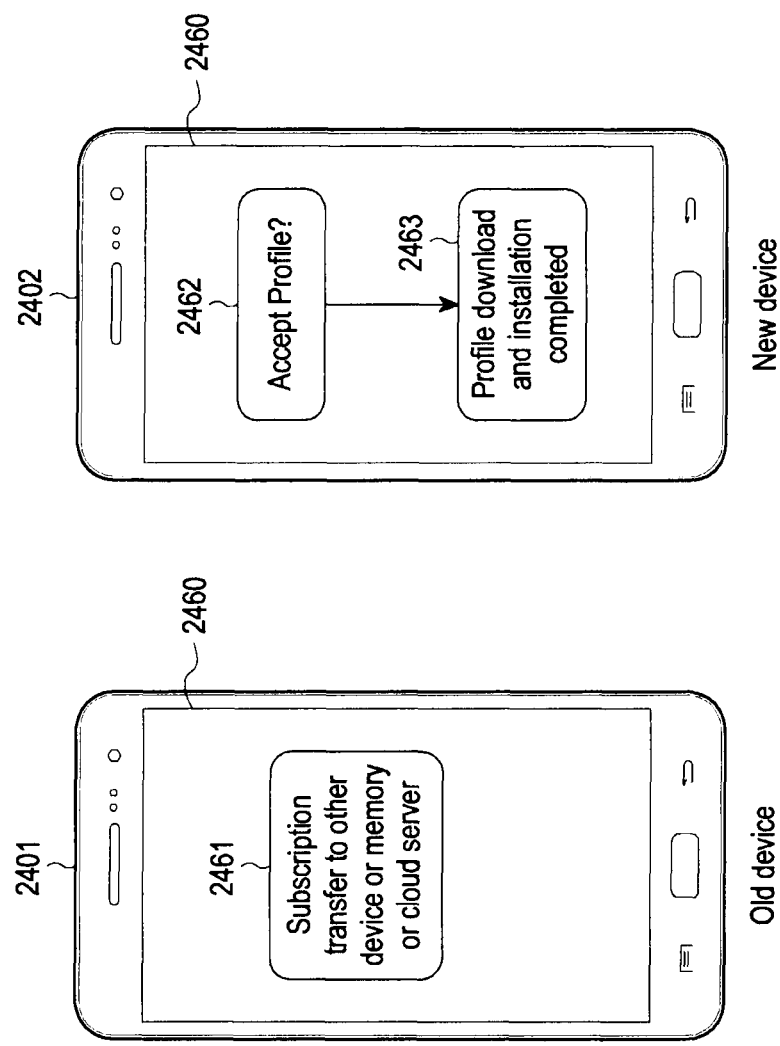
FIGS. 24 and 25 illustrate a method of moving a profile to a secure memory according to various embodiments.
Figure 25:
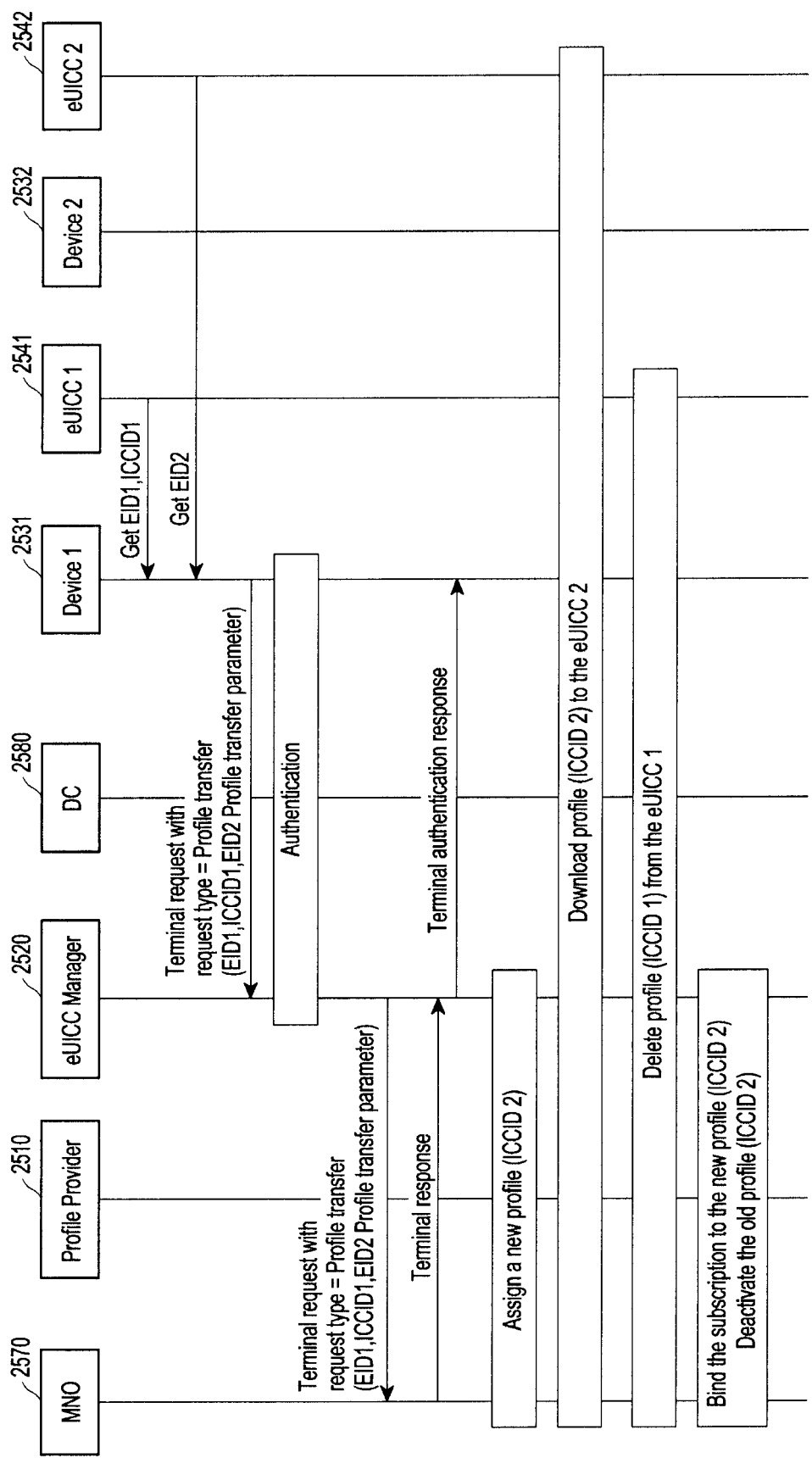

FIGS. 24 and 25 illustrate a method of moving a profile to a secure memory according to various embodiments.

As illustrated in FIG. 24, according to various embodiments, a first device (old device) 2401 may display information (Subscription transfer to other device or memory or cloud server) indicating that a pre-stored profile has been transferred to a second device (new device) 2402 through a display 2460.

According to various embodiments, the first device 2401 may delete the pre-stored profile from the secure memory of the first device 2401 while transmitting the pre-stored profile to the second device 2402. Accordingly, there is the advantage of securing a storage space within the secure memory of the first device 2401.

According to various embodiments, the second device 2402 may display a profile storage inquiry window 2462 for receiving selection input in order to inquire about whether to store the profile transmitted from the first device 2401 through the display.

According to various embodiments, when selection input for receiving the profile transmitted from the first device 3502 from the user is received, the second device 2402 may store the profile transmitted from the first device 2401 in the secure memory of the second device 2402.

According to various embodiments, the second device 2402 may receive the profile from the first device 2401 and display information (Profile download and installation completed) 2460 indicating that the profile has been stored through the display 2460.

As illustrated in FIG. 25, according to various embodiments, a first device (Device 1) 2531 may transmit one or more of at least one profile pre-stored in eUICC #1 2541 to a second device 2532 in order to secure the memory space of eUICC #1 2541 of the first device. According to various embodiments, the first device 2531 may make a request to the second device 2532 for EID 2 of eUICC #2 2542 of the second device and may transmit a terminal request for profile transfer along with EID 1, a first profile (ICCID 1), EID 2, and a profile transfer parameter to an EUICC manager 2520.

According to various embodiments, the eUICC Manager 2520 may perform an authentication process as described through the first device 2401 (2531) illustrated in FIG. 24 and, when authentication is completed, make a request for a profile transfer to an MNO 2570.

According to various embodiments, the MNO 2570 may transmit the authentication result to the eUICC Manager 2520 and transmit a request for generating the profile (ICCID 2) to the Profile Provider 2510.

According to various embodiments, the eUICC Manager 2520 may transmit approval of the profile request to the first device 2531. According to various embodiments, when a profile download (for example, storage) is completely approved as described through the second device 2401 of FIG. 24, the second device 2532 may start downloading (for example, storing) the profile (ICCID 2).

According to various embodiments, when the profile (ICCID 2) is completely downloaded to eUICC #2 2542 of the second device, the MNO 2570 may instruct the eUICC Manager 2520 to transmit a request to the first device 2531 to delete the profile (ICCID 1) of the first electronic device 2531.

According to various embodiment, when the profile (ICCID 1) of the first device 2531 is deleted, the MNO 2570 may move (or copy) subscription information of the existing profile (ICCID 1) to a new profile (ICCID 2) and delete or deactivate the subscription information of the existing profile (ICCID 1).

According to various embodiments, the second device 2532 may provide the user with the network of the MNO 2570 using the new profile (ICCID 2).

An electronic device according to various embodiments of the present disclosure may include a communication module; a memory including a secure area for storing one or more profiles corresponding to one or more Subscriber Identity Modules (SIMs); and a processor, wherein the processor may be configured to acquire a request for storing another profile in the memory, and to delete at least one of the profiles from the memory or move at least one profile to another memory including another secure area, operationally connected to the electronic device in response to the request.

According to various embodiments, the processor may be configured to provide a User Interface (UI) for selecting at least one profile from the profiles in response to the request.

According to various embodiments, the processor may be configured to provide a user interface based on priorities of the profiles.

According to various embodiments, the priories may be rankings of the use pattern of a user with respect to the one or more profiles.

According to various embodiments, the electronic device may further include a display, wherein the processor may control the display to arrange and display at least one of the profiles based on the priorities.

According to various embodiments, the processor may be configured to delete at least one of the profiles from the memory or move at least one profile to another memory including another secure area, operationally connected to the electronic device based on user input received through the display.

According to various embodiments, the processor may transmit identification information of at least one profile to an external server of the electronic device by controlling the communication module and deleting at least one profile from the memory according to a control command received from the external server based on the transmitted identification information of the profile.

According to various embodiments, when a request to store the other profile in the memory is received, the processor may identify the capacity of the other profile and the remaining capacity of the memory, and delete or move at least one profile according to a result of the identification.

According to various embodiments, the processor may be configured to store the other profile in the memory after at least one profile is moved to the other memory.

According to various embodiments, the other memory may be included in an external electronic device, and the processor may be configured to transmit another request to store at least one profile to the external electronic device and to perform the movement based on at least a response to the other request received from the external electronic device.

A method of controlling an electronic device including a memory, a secure area for storing one or more profiles corresponding to one or more Subscriber Identity Modules (SIMs), and a processor, according to various embodiments of the present disclosure, may include an operation of acquiring a request to store another profile in the memory; and a deletion operation of at least one of the profiles from the memory or moving at least one profile to another memory including another secure area, operationally connected to the electronic device in response to the request.

According to various embodiments, the method further includes the operation to provide a User Interface (UI) to select at least one profile from the profiles in response to the request.

According to various embodiments, the method further includes an operation to provide a user interface based on priorities of the profiles.

According to various embodiments, the priories may be rankings of the use pattern of a user with respect to the one or more profiles.

According to various embodiments, the method further includes an operation to arrange and display at least one of the profiles based on the priories.

According to various embodiments, the method further includes an operation to delete at least one of the profiles from the memory or moving at least one profile to another memory including another secure area, operationally connected to the electronic device in response to the request.

According to various embodiments, the method further includes an operation to transmit identification information of at least one profile to an external server of the electronic device and an operation to delete at least one profile from the memory according to a control command received from the external server based on the identification information of the transmitted profile.

According to various embodiments, when a request to store the other profile in the memory is acquired, the method further includes an operation to identify the capacity of the other profile and the remaining capacity of the memory, and to delete or move at least one profile according to a result of the identification.

According to various embodiments, the method further includes an operation to store the other profile in the memory after at least one profile is moved to the other memory.

A computer-readable electronic device that is a storage medium for recording a program including instructions according to various embodiments of the present disclosure is provided. The instructions may be configured to cause at least one processor to perform at least one operation when executed by at least one processor. At least one operation may include an operation to store a profile in the memory operationally connected to the electronic device, to acquire a request to store another profile in the memory, an operation to delete at least one of the profiles from the memory, or to move at least one profile to another memory including another secure area operationally connected to the electronic device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 820), may cause the one or more processors to execute the function corresponding to the instruction. The computer-readable storage medium may be, for example, the memory 830.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. An electronic device comprising:
    a display;
    a communication module;
    a memory including a secure area for storing one or more eSIM (Embedded Subscriber Identity Module) profiles; and
    a processor coupled to memory, communication module, and display,
    wherein the processor is configured to:
    acquire a request for storing another eSIM profile in the memory, and to
    when it is determined that a download of the another eSIM profile is not possible based on a remaining capacity of the memory, display, on the display, a first recommendation list in which the one or more eSIM profiles are sorted based on a first priority and a second recommendation list in which the one or more eSIM profiles are sorted based on a second priority, wherein the first recommendation list and the second recommendation list include the same one or more pre-stored eSIM profiles, and
    in response to selecting at least one eSIM profile through a user input among the first recommendation list the second recommendation list, delete the selected at least one eSIM profile from the memory or move the selected at least one eSIM profile to another memory including another secure area, operationally connected to the electronic device.

2. The electronic device of claim 1, wherein the processor is configured to transmit identification information of the at least one eSIM profile to an external server of the electronic device by controlling the communication module and delete the at least one eSIM profile from the memory according to a control command received from the external server based on the transmitted identification information of the eSIM profile.

3. The electronic device of claim 1, wherein the processor is configured to store the other eSIM profile in the memory after the at least one eSIM profile is moved to the other memory.

4. The electronic device of claim 1, wherein the other memory is included in an external electronic device, and the processor is configured to transmit another request for storing the at least one eSIM profile to the external electronic device and to perform movement of the at least one eSIM profile at least based on a response to another request received from the external electronic device.

5. A method of controlling an electronic device, the method comprising:
    in the electronic device comprising a memory including a secure area for storing one or more eSIM (Embedded Subscriber Identity Module) profiles and a processor, the method comprising:
    acquiring a request for storing another eSIM profile in the memory;
    when it is determined that a download of the another eSIM profile is not possible based on a remaining capacity of the memory, displaying a first recommendation list in which the one or more eSIM profiles are sorted based on a first priority and a second recommendation list in which the one or more eSIM profiles are sorted based on a second priority, wherein the first recommendation list and the second recommendation list include the same one or more pre-stored eSIM profiles; and
    in response to selecting at least one eSIM profile through a user input among the first recommendation list the second recommendation list, deleting the selected at least one eSIM profile from the memory or moving the selected at least one eSIM profile to another memory including another secure area, operationally connected to the electronic device in response to the request.

* * * * *